US012786850B2

(12) United States Patent
Kim

(10) Patent No.: US 12,786,850 B2
(45) Date of Patent: Nov. 3, 2026

(54) METHOD AND DEVICE FOR TRANSMITTING AND RECEIVING SIGNAL FOR SUPPORTING NON-PUBLIC NETWORK (NPN) IN WIRELESS COMMUNICATION SYSTEM

(71) Applicant: Samsung Electronics Co., Ltd., Gyeonggi-do (KR)

(72) Inventor: Sangbum Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 287 days.

(21) Appl. No.: 18/552,606

(22) PCT Filed: Mar. 31, 2022

(86) PCT No.: PCT/KR2022/004610
§ 371 (c)(1),
(2) Date: Sep. 26, 2023

(87) PCT Pub. No.: WO2022/211531
PCT Pub. Date: Oct. 6, 2022

(65) Prior Publication Data

US 2024/0172093 A1 May 23, 2024

(30) Foreign Application Priority Data

Apr. 1, 2021 (KR) ........................ 10-2021-0042846
Oct. 21, 2021 (KR) ........................ 10-2021-0141372

(51) Int. Cl.
*H04W 48/08* (2009.01)
*H04W 76/10* (2018.01)

(52) U.S. Cl.
CPC ........... *H04W 48/08* (2013.01); *H04W 76/10* (2018.02)

(58) Field of Classification Search
CPC ........................... H04W 48/16; H04B 7/18545
(Continued)

(56) References Cited

U.S. PATENT DOCUMENTS 11,330,480 B2 5/2022 Kim et al.
2021/0058784 A1 2/2021 Kedalagudde et al.
2022/0167260 A1 5/2022 Chun
2022/0225272 A1 * 7/2022 Yang .................... H04W 68/02
(Continued)

FOREIGN PATENT DOCUMENTS

WO WO 2020/204536 10/2020

OTHER PUBLICATIONS

Rapporteur, "Status Report to TSG", RP-210776, 3GPP TSG RAN Meeting #91-e, Mar. 16-26, 2021, 5 pages.
(Continued)

*Primary Examiner* — Fabricio R Murillo Garcia
(74) *Attorney, Agent, or Firm* — The Farrell Law Firm, P.C.

(57) ABSTRACT

A method of the present disclosure for transmitting and receiving signals for supporting a non-public network (NPN) in a wireless communication system may include receiving, by an access stratum (AS) of a user equipment (UE), an onboarding indicator and a group identification (GID) from at least one stand-alone non-public network (SNPN) base station, reporting an onboarding indicator and a GID of each of the at least one SNPN base station, from the AS of the UE to a non-access stratum (NAS) of the UE, and when the NAS of the UE selects an SNPN base station to perform an onboarding access from among the at least one SNPN base station, transmitting an RRCSetupRequest message from the AS of the UE to the selected SNPN.

4 Claims, 12 Drawing Sheets

(58) Field of Classification Search
USPC .......................................................... 455/434
See application file for complete search history.

(56) References Cited

U.S. PATENT DOCUMENTS

| | | | | |
|---|---|---|---|---|
| 2022/0312359 | A1* | 9/2022 | Shih | H04W 8/205 |
| 2023/0019791 | A1* | 1/2023 | Chen | H04W 36/0016 |
| 2023/0199632 | A1* | 6/2023 | Talebi | H04W 48/10 455/434 |
| 2024/0224163 | A1* | 7/2024 | Starsinic | H04W 12/06 |

OTHER PUBLICATIONS

3GPP TR 23.700-07 V17.0.0, (Mar. 2021), 248 pages.
Intel, "KI#4; Group IDs and UE Onboarding", S2-2101075, SA WG2 Meeting #143E (E-meeting), Feb. 24-Mar. 9, 2021, 5 pages.
European Search Report dated Aug. 9, 2024 issued in counterpart application No. 22781650.1-1215, 15 pages.
PCT/ISA/210, International Search Report dated Jun. 30, 2022 issued in counterpart application No. PCT/KR2022/004610, 5 pages.
PCT/ISA/237, Written Opinion dated Jun. 30, 2022 issued in counterpart application No. PCT/KR2022/004610, 4 pages.
CMCC, "Discussion the issues to support UE on-boarding and provisioning", 3GPP TSG-RAN WG2 #113e R2-2101616 Online, Jan. 25-Feb. 5, 2021, pp. 11.
Vivo, "Support SNPN with subscription or credentials by a separate entity", 3GPP TSG-RAN WG2 Meeting #113 electronic R2-2100838 E-Meeting, Jan. 25-Feb. 5, 2021, pp. 6.
LG Electronics Inc., "RAN2 impact to support SNPN with subscription or credentials by a separate entity", 3GPP TSG-RAN2 #113e R2-2101515 Electronic meeting, Jan. 25-Feb. 5, 2021, pp. 7.
Ericsson, "Summary of [AT113-e][032][eNPN] UE onboarding and provisioning for NPN", 3GPP TSG-RAN WG2 #113e R2-2102363 Electronic meeting, Jan. 25-Feb. 5, 2021, pp. 18.
EP Communication Report dated Aug. 21, 2026 issued in counterpart application No. 22781650.1-1206, 8 pages.

* cited by examiner

METHOD AND DEVICE FOR TRANSMITTING AND RECEIVING SIGNAL FOR SUPPORTING NON-PUBLIC NETWORK (NPN) IN WIRELESS COMMUNICATION SYSTEM

PRIORITY

This application is a National Phase Entry of PCT International Application No. PCT/KR2022/004610, which was filed on Mar. 31, 2022, and claims priority to Korean Patent Application Nos. 10-2021-0042846 and 10-2021-0141372, which were filed on Apr. 1, 2021 and Oct. 21, 2021, respectively, the entire content of each of which is incorporated herein by reference.

TECHNICAL FIELD

The present disclosure relates to a method and apparatus for transmitting and receiving signals for supporting a non-public network (NPN) in a wireless communication system.

BACKGROUND ART

Considering the development of wireless communication from generation to generation, the technologies have been developed mainly for services targeting humans, such as voice calls, multimedia services, data services, and the like. Following the commercialization of $5^{th}$ generation (5G) communication systems, it is expected that connected devices being exponentially growing will be connected to communication networks. Examples of things connected to networks may include vehicles, robots, drones, home appliances, displays, smart sensors connected to various infrastructures, construction machines, factory equipment, and the like. Mobile devices are expected to evolve in various form-factors such as augmented reality glasses, virtual reality headsets, hologram devices, and the like. In order to provide various services by connecting hundreds of billions of devices and things in the $6^{th}$ generation (6G) era, there have been ongoing efforts to develop enhanced 6G communication systems. For these reasons, 6G communication systems are referred to as beyond-5G systems.

6G communication systems, which are expected to be commercialized around 2030, will have a peak data rate of tera (i.e., 1,000 giga)-level bps and radio latency less than 100 psec. That is, the 6G communication systems will be 50 times as fast as 5G communication systems and have the 1/10 radio latency thereof.

In order to achieve such a high data rate and ultra-low latency, it has been considered to implement the 6G communication systems in a terahertz band (for example, 95 GHz to 3 THz bands). It is expected that, due to severer path loss and atmospheric absorption in the terahertz bands than those in mmWave bands introduced in 5G, technologies capable of securing the signal transmission distance, that is, coverage, will become more important. It is necessary to develop, as major technologies for securing the coverage, radio frequency (RF) elements, antennas, novel waveforms having better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, in order to improve the coverage of terahertz-band signals, there has been ongoing discussion on new technologies such as metamaterial-based lenses and antennas, a high-dimensional spatial multiplexing technology using orbital angular momentum (OAM), reconfigurable intelligent surface (RIS), and the like.

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for using satellites, high-altitude platform stations (HAPS), and the like in an integrated manner; an improved network structure for supporting mobile base stations and the like and enabling network operation optimization and automation and the like; a dynamic spectrum sharing technology via collision avoidance based on a prediction of spectrum usage; an use of artificial intelligence (AI) in wireless communication for improvement of overall network operation by using AI in a designing phase for developing 6G and internalizing end-to-end AI support functions; and a next-generation distributed computing technology for overcoming the limit of UE computing ability through reachable super-high-performance communication and computing resources (such as mobile edge computing (MEC), clouds, and the like) over the network. In addition, through designing new protocols to be used in the 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of the 6G communication systems in hyper-connectivity, including person to machine (P2M) as well as machine to machine (M2M), will allow the next hyper-connected experience. In more detail, it is expected that services such as truly immersive extended reality (XR), high-fidelity mobile hologram, and digital replica could be provided through the 6G communication systems. In addition, services such as remote surgery for security and reliability enhancement, industrial automation, and emergency response will be provided through the 6G communication system, such that the technologies could be applied in various fields such as industry, medical care, automobiles, home appliances, and the like.

DISCLOSURE

Technical Problem

In embodiments of the present disclosure, a method and apparatus for transmitting and receiving signals for supporting a non-public network (NPN) may be provided.

Technical Solution

According to the present disclosure, a method of transmitting and receiving signals for supporting a non-public network (NPN) in a wireless communication system may include receiving, by an access stratum (AS) of a user equipment (UE), an onboarding indicator and a group identification (GID) from at least one stand-alone non-public network (SNPN) base station, reporting an onboarding indicator and a GID of each of the at least one SNPN base station, from the AS of the UE to a non-access stratum (NAS) of the UE, and when the NAS of the UE selects an SNPN base station to perform an onboarding access from among the at least one SNPN base station, transmitting an RRCSetupRequest message from the AS of the UE to the selected SNPN.

BEST MODE

Figure 1A:
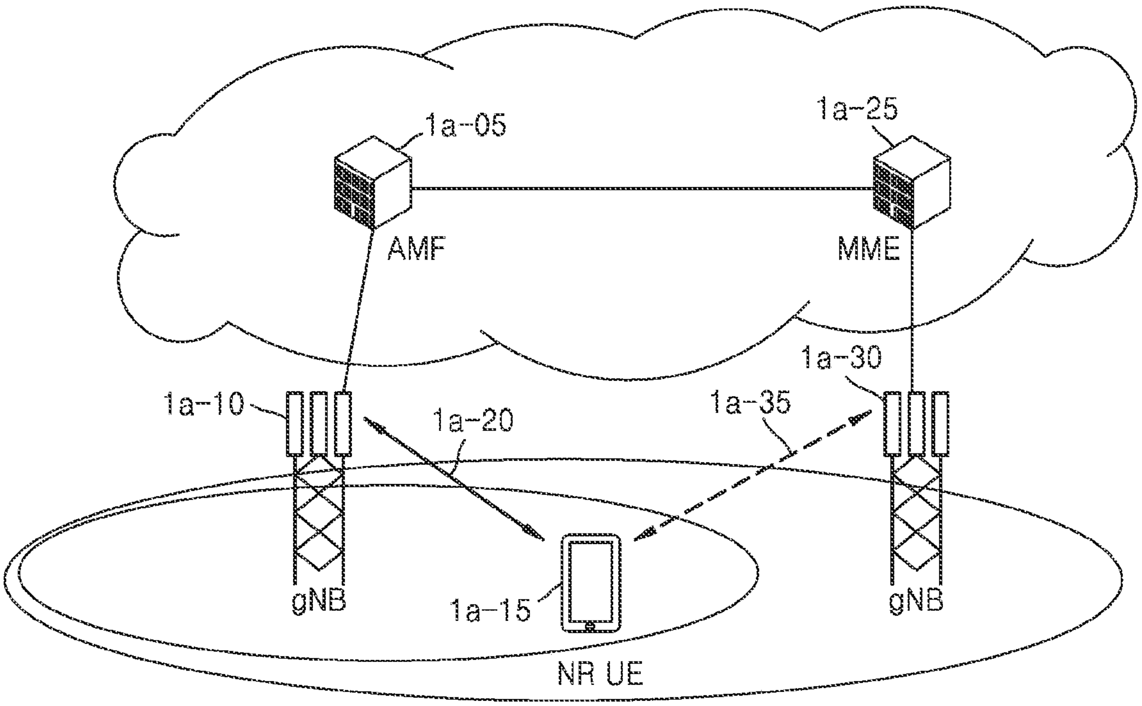
FIG. 1A is a diagram illustrating an architecture of a next-generation mobile communication system according to an embodiment of the present disclosure.

According to an embodiment of the present disclosure, a method performed by a user equipment (UE) for supporting a non-public network (NPN) in a wireless communication system may include: receiving, by an access stratum (AS) of the UE, an onboarding indicator and a group identification (GID) from at least one stand-alone non-public network (SNPN) base station; reporting an onboarding indicator and a GID of each of the at least one SNPN base station, from the AS of the UE to a non-access stratum (NAS) of the UE; and when the NAS of the UE selects an SNPN base station to perform an onboarding access from among the at least one SNPN base station, transmitting an RRCSetupRequest message from the AS of the UE to the selected SNPN.

According to an embodiment of the present disclosure, a method performed by a stand-alone non-public network (SNPN) base station for supporting a non-public network (NPN) in a wireless communication system may include: broadcasting an onboarding indicator and a group identification (GID); and when the onboarding indicator and the GID are received by an access stratum (AS) of a user equipment (UE), and the SNPN base station is selected by a non-access stratum (NAS) of the UE having received the onboarding indicator and the GID from the AS of the UE, receiving an RRCSetupRequest message from the AS of the UE, wherein the AS of the UE reports an onboarding indicator and a GID of at least one SNPN base station including the SNPN base station to the NAS of the UE.

According to an embodiment of the present disclosure, a user equipment (UE) for supporting a non-public network (NPN) in a wireless communication system may include: a transceiver; and a processor coupled with the transceiver and configured to receive, by an access stratum (AS) of the UE, an onboarding indicator and a group identification (GID) from at least one stand-alone non-public network (SNPN) base station, report an onboarding indicator and a GID of each of the at least one SNPN base station, from the AS of the UE to a non-access stratum (NAS) of the UE, and when the NAS of the UE selects an SNPN base station to perform an onboarding access from among the at least one SNPN base station, transmit an RRCSetupRequest message from the AS of the UE to the selected SNPN.

According to an embodiment of the present disclosure, a stand-alone non-public network (SNPN) base station for supporting a non-public network (NPN) in a wireless communication system may include: a transceiver; and a processor coupled with the transceiver and configured to broadcast an onboarding indicator and a group identification (GID), and when the onboarding indicator and the GID are received by an access stratum (AS) of a user equipment (UE), and the SNPN base station is selected by a non-access stratum (NAS) of the UE having received the onboarding indicator and the GID from the AS of the UE, receive an RCSetupRequest message from the AS of the UE, wherein the AS of the UE reports an onboarding indicator and a GID of at least one SNPN base station including the SNPN base station to the NAS of the UE.

MODE FOR INVENTION

In the description of the present disclosure, detailed descriptions of the related art are omitted when it is deemed that they may unnecessarily obscure the essence of the present disclosure. Hereinafter, an embodiment of the present disclosure will be described with reference to accompanying drawings.

FIG. 1A is a diagram illustrating an architecture of a next-generation mobile communication system.

Referring to FIG. 1A, as illustrated, a radio access network of the next-generation mobile communication system (New Radio (NR)) includes a new radio node B (hereinafter, next-generation node B (gNB)) 1*a*-10 and a new radio core network (AMF) 1*a*-05. A new radio user equipment (hereinafter, NR UE or UE) 1*a*-15 accesses an external network via the gNB 1*a*-10 and the AMF 1*a*-05.

In FIG. 1A, the gNB corresponds to an evolved node B (eNB) of a legacy long term evolution (LTE) system. The gNB may be connected to the NR UE via wireless channels and may provide superior services compared to a legacy node B (1*a*-20). All user traffic data may be serviced through shared channels in the next-generation mobile communication system, and thus, an entity for collating buffer status information of UEs, available transmission power status information, and channel state information and performing scheduling may be required and the gNB 1*a*-10 may operate as such an entity. One gNB may generally control a plurality of cells. The NR may have a bandwidth greater than the maximum bandwidth of the legacy LTE system so as achieve an ultrahigh data rate, and may use an orthogonal frequency division multiplexing (OFDM) scheme as a radio access technology and may additionally apply a beamforming technology to the radio access technology. Furthermore, the NR may also use adaptive modulation & coding (AMC) to determine a modulation scheme and a channel coding rate in accordance with a channel state of a UE. The AMF 1*a*-05 may perform functions such as mobility support, bearer configuration, and quality of service (QoS) configuration. The AMF 1*a*-05 is an entity for performing a mobility management function and various control functions on the UE and is connected to a plurality of base stations (BSs). Also, the next-generation mobile communication system may cooperate with the legacy LTE system, and the AMF 1*a*-05 may be connected to a mobility management entity (MME) 1*a*-25 via a network interface. The MME 1*a*-25 is connected to an eNB 1*a*-30 that is a legacy BS. A UE supporting LTE-NR dual connectivity may transmit and receive data while maintaining connection not only to a gNB but also to an eNB (1*a*-35).

In the next-generation mobile communication system, 3 radio access states (radio resource control (RRC) states) may be defined. A connected mode (RRC_CONNECTED) indicates a radio access state in which a UE can transmit and receive data. An idle mode (RRC_IDLE) indicates a radio access state in which a UE monitors whether paging is transmitted to the UE. The two modes are radio access states that are also applied to the legacy LTE system, and detailed technologies are the same as those of the legacy LTE system. In the next-generation mobile communication system, an inactive radio access state (RRC_INACTIVE) is newly defined. In the radio access state, a UE context is maintained for both a BS and a UE, and RAN-based paging is supported. Characteristics of the new radio access state are listed below.

Cell re-selection mobility: (cell re-selection mobility);

CN-NR RAN connection (both C/U-planes) has been established for UE; (CN-NR RAB connection (both C/U-planes) has been established for UE)

The UE AS context is stored in at least one gNB and the UE; (The UE AS context is stored in at least one of a gNB and the UE)

Paging is initiated by NR RAN; (Paging is initiated by NR RAN)

RAN-based notification area is managed by NR RAN; (RAN-based notification area is managed by NR RAN)

NR RAN knows the RAN-based notification area which the UE belongs to; (NR RAN knows the RAN-based notification area which the UE belongs to)

The new INACTIVE radio access state may be switched to a connected mode or an idle mode, by using a particular procedure. According to a resume procedure, the INACTIVE mode may be switched to a connected mode, and the connected mode may be switched to the INACTIVE mode by using a release procedure including suspend configuration information. In the procedure, one or more RRC messages may be transmitted and received between a UE and a BS, and the procedure may include one or more steps. Also, via a release procedure after resume, the INACTIVE mode may be switched to an idle mode. The switching between the connected mode and the idle mode follows the existing LTE technology. That is, via an establishment or release procedure, the switching between the modes is performed.

Figure 1B:
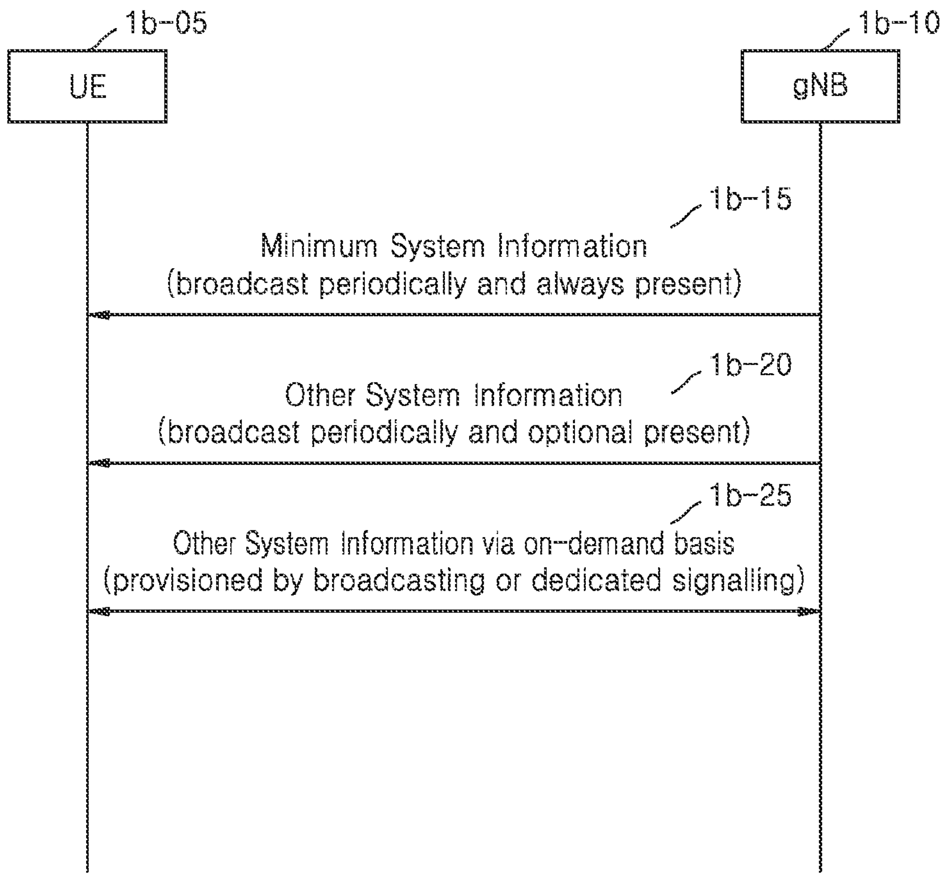
FIG. 1B is a diagram for describing a method of providing system information in a next-generation mobile communication system according to an embodiment of the present disclosure.

FIG. 1B is a diagram for describing a method of providing system information in a next-generation mobile communication system.

The system information a gNB 1*b*-10 broadcasts in the next-generation mobile communication system is broadly classified into minimum system information (SI) and other system information. The minimum SI is always periodically broadcast (1*b*-15), and includes configuration information necessary for initial access and SI scheduling information necessary to receive other SI that is periodically or optionally broadcast. A master information block (MIB) and a system information block1 (SIB1) are included in the minimum SI. The other SI basically includes all configuration information not included in the minimum SI. The other SI is periodically broadcast (1*b*-20), or is broadcast based on a UE request or is provided to a UE by dedicated signaling (1*b*-25). When the other SI is received based on the UE request, the UE needs to check, before performing the request, whether the other SI is valid in the cell or is currently broadcast (by a request of other UE). The checking may be performed via particular information provided by the minimum SI. The UE in an idle mode (RRC_IDLE) or an INACTIVE mode (RRC_INACTIVE) may request the other SI without a change in a current RRC state. The UE in a connected mode (RRC_CONNECTED) may request and receive the other SI by dedicated RRC signaling. The other SI is broadcast at regular intervals for a preset time period. Public warning system (PWS) information is classified into the other SI and provided. It is network implementation as to whether to broadcast the other SI or to provide the other SI for UE by dedicated RRC signaling.

Another character of the other SI in the next-generation mobile communication system is that it is possible to notify, via SIB1, that same information is broadcast in neighboring cells for each SIB. As it is notified, via SIB1, that the same information is broadcast in neighboring cells for each SIB, when a user moves to a neighboring cell and an SIB of a cell before the movement is equal to an SIB of a cell after the movement, an operation of unnecessarily re-obtaining an SIB may be prevented. SIB1 indicates that it is an area-based SIB capable of having same information as a neighboring cell, by using areaScope field of each SIB belonging to the other SI, excluding MIB and SIB1. Also, with areaScope field, an area ID of a corresponding cell and systemInformationAreaID may also be provided. After moving to a neighboring cell, if the area ID provided by SIB1 broadcast from the neighboring cell has the same value, the UE does not need to re-obtain the area-based SIB.

Figure 1C:
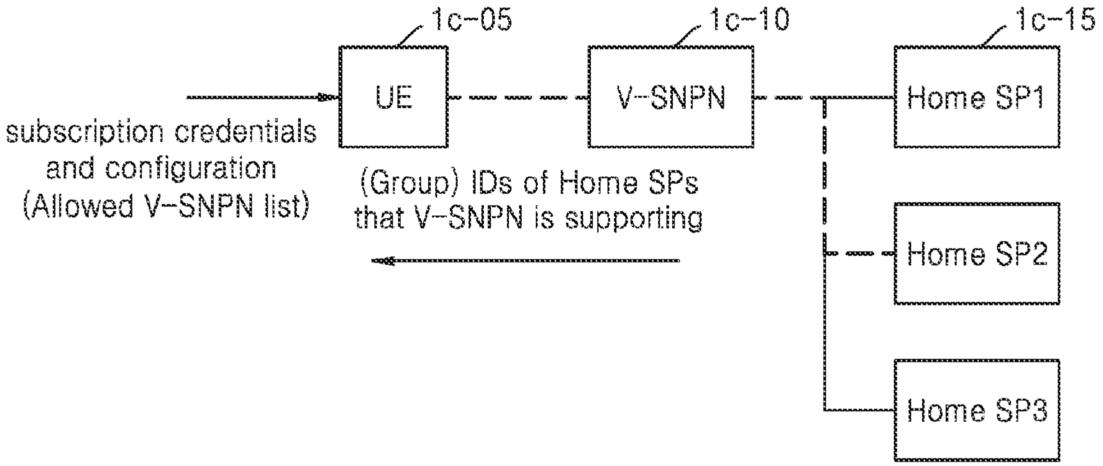
FIG. 1C is a conceptual diagram for describing visited-stand-alone non-public network (V-SNPN) according to an embodiment of the present disclosure.

FIG. 1C is a conceptual diagram for describing V-SNPN according to an embodiment of the present disclosure.

Rel-16 NR mobile communication system is enhanced to support a non-public network (NPN). The NPN is broadly divided into a closed access group (CAG) and a stand-alone non-public network (SNPN). The CAG is also referred to as a public network integrated NPN (PNI-NPN), and indicates an NPN provided to interoperate with a network provided by a mobile communication provider. In order to indicate the PNI-NPN, a BS may broadcast SIB1 including PNI-NPN ID. The PNI-NPN ID is composed of a public land mobile network (PLMN) ID and a CAG ID, and the PLMN ID indicates an ID of one of PLMNs of the mobile communication provider that provides the cell. On the other hand, an SNPN indicates an NPN that does not interoperate with the network provided by the mobile communication provider. In order to indicate the SNPN, the BS may broadcast SIB1 including an SNPN ID. The SNPN ID is composed of a PLMN ID and a network identity (NID), and the PLMN ID and the NID are irrelevant to the mobile communication provider. A UE may be configured to an SNPN mode, and in this case, the UE does not perform a normal cell reselection operation. If not configured to the SNPN mode, the UE may perform the normal cell reselection operation while camping on an SNPN cell.

The UE previously has information of an NPN to which the UE can access, and determines whether to access the cell, in consideration of a PNI-NPN or SNPN ID broadcast via the SIB1.

The present disclosure provides a method by which an SNPN cell supports an access to a home SP. In the present disclosure, an SNPN may support an external service provider. In the present disclosure, this is referred to as a home service provider (Home SP) 1c-15. For example, an SNPN network may be established to wirelessly control a smart factory. Workers who work in the factory may want to be provided a service from an external service provider via the SNPN network. The external service provider may indicate an existing wired/wireless communication provider. Here, an AMF and an SMF in an SNPN in the factory may be connected to network entities of the external service provider so as to connect a user with the external service provider. The SNPN may be described as a visited-SNPN (V-SNPN) 1c-10. The V-SNPN 1c-10 may broadcast ID information of a home SP supported by itself, by using system information. When a UE 1c-05 receives the system information, the UE 1c-05 may determine whether it is possible to access the V-SNPN 1c-10, by using subscription credentials and configuration the UE previously has. The present disclosure describes the access as a credential access as the access uses a credential. For example, the subscription credentials and configuration may include list information of access-allowed V-SNPNs.

Figure 1D:
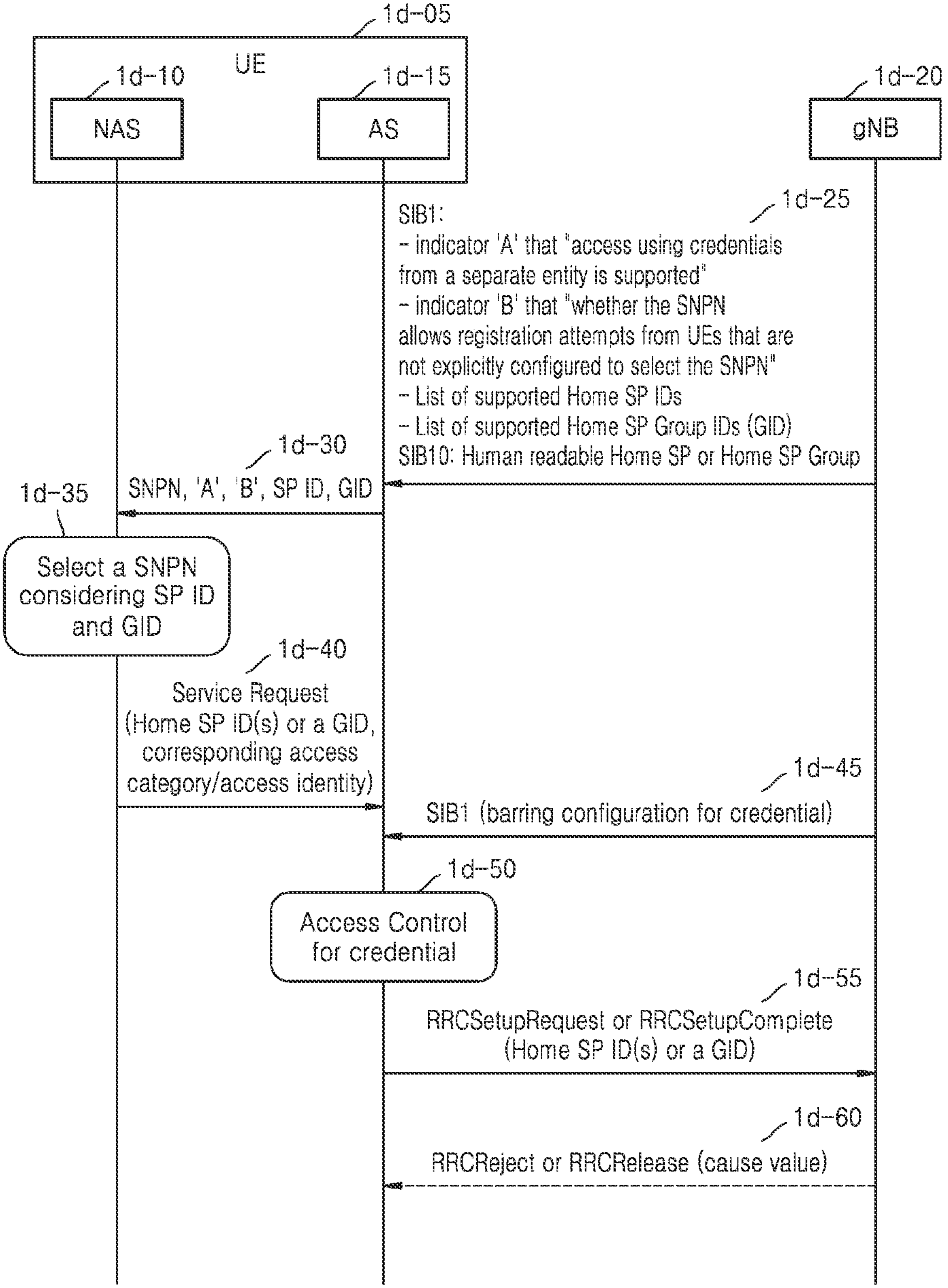
FIG. 1D illustrates a flowchart of a procedure for accessing a V-SNPN support cell according to an embodiment of the present disclosure.

FIG. 1D illustrates a flowchart of a procedure for accessing a V-SNPN support cell according to an embodiment of the present disclosure.

In FIG. 1D, the V-SNPN support cell is described as a V-SNPN gNB 1d-20, for convenience of descriptions. The V-SNPN gNB 1d-20 may broadcast information below, by using system information (1d-25).

- Indicator A, which is connected to network entities of an external service provider so as to indicate whether connection between a user and the external service provider is supported or not (i.e. whether access using credentials from a separate entity is supported or not). The information may be broadcast via preset SIB (e.g., SIB1).
- Indicator B, which indicates whether UEs that are not configured to select an SNPN are allowed to attempt registration (i.e. whether the SNPN allows registration attempts from UEs that are not explicitly configured to select the SNPN). The information may be broadcast via preset SIB (e.g., SIB1).
- ID list information of one or more home SPs supported by the V-SNPN gNB 1d-20. The information may be broadcast via preset SIB (e.g., SIB1), and may be provided for each SNPN supported by a corresponding cell.
- Group ID list information of one or more home SPs supported by the V-SNPN gNB 1d-20. When the V-SNPN gNB 1d-20 supports many home SPs, an amount of information to be broadcast via system information may sharply increase. Therefore, in order to decrease the signaling overhead, preset home SPs may be configured as one group. When the V-SNPN gNB 1d-20 supports all or some of home SPs included in the group, the V-SNPN gNB 1d-20 may broadcast an ID of the group via preset SIB (e.g., SIB1). With the group ID list, an ID list of supported home SPs may also be broadcast. In the present disclosure, the group ID is described as a group ID (GID). The information may be provided for each SNPN supported by a corresponding cell.
- Name information of a home SP or GID which is readable to a human. When the V-SNPN gNB 1d-20 supports a plurality of home SPs or GIDs and a UE can support some of the plurality of home SPs or the GIDs, a user may manually select one of them. Therefore, in order to support this, there is a need to identify them with names that are readable to a human. In the present disclosure, human-readable home SP or GID information may be broadcast to the UE by using preset SIB (e.g., SIB10). The information may be provided for each SNPN supported by a corresponding cell.

A UE AS 1d-15 having received the information via the SIB may transmit the received information to a UE NAS 1d-10. That is, the home SP and GID information for the indicators A and B and each SNPN may be transmitted to the UE NAS (1d-30). The UE NAS 1d-10 having received the information may select an SNPN to be accessed and a home SP or GID to be accessed, and may determine an access identity and an access category which correspond to a service type (1d-35). When an ATTACH or a service request is triggered, the UE NAS 1d-10 may transmit the selected information to the UE AS 1d-15 (1d-40).

In order to ease network congestion, the V-SNPN gNB 1d-20 may broadcast system information including barring configuration information for each SNPN (1d-45). The UE having received the information may determine whether an attempt via a barring check operation is allowed so as to attempt the access (1d-50).

In the present disclosure, the barring check operation may be performed based on an access identity and an access category. The access identity is indication information defined in the 3GPP, i.e., the standard document. The access identity may be used to indicate a particular access as in Table below. Accesses mainly classified into Access Class 11 to 15, a multimedia priority service (MPS) having priority, and a mission critical service (MCS) may be indicated. The Access Class 11 to 15 may be used to indicate accesses dedicated for business operators or public purposes.

| Access Identity number | UE configuration |
|---|---|
| 0 | UE is not configured with any parameters from this table |
| 1 (NOTE 1) | UE is configured for Multimedia Priority Service (MPS). |
| 2 (NOTE 2) | UE is configured for Mission Critical Service (MCS). |
| 3-10 | Reserved for future use |
| 11 (NOTE 3) | Access Class 11 is configured in the UE. |
| 12 (NOTE 3) | Access Class 12 is configured in the UE. |
| 13 (NOTE 3) | Access Class 13 is configured in the UE. |
| 14 (NOTE 3) | Access Class 14 is configured in the UE. |
| 15 (NOTE 3) | Access Class 15 is configured in the UE. |

(NOTE 1):
Access Identity 1 is used to provide overrides according to the subscription information in UEs configured for MPS. The subscription information defines whether an override applies to UEs within one of the following categories:
a) UEs that are configured for MPS;
b) UEs that are configured for MPS and are in the PLMN listed as most preferred PLMN of the country where the UE is roaming in the operator-defined PLMN selector list or in their HPLMN or in a PLMN that is equivalent to their HPLMN;
c) UEs that are configured for MPS and are in their HPLMN or in a PLMN that is equivalent to it.
(NOTE 2):
Access Identity 2 is used to provide overrides according to the subscription information in UEs configured for MCS. The subscription information defines whether an override applies to UEs within one of the following categories:
a) UEs that are configured for MCS;

-continued

| Access Identity number | UE configuration |
|---|---|

b) UEs that are configured for MCS and are in the PLMN listed as most preferred PLMN of the country where the UE is roaming in the operator-defined PLMN selector list or in their HPLMN or in a PLMN that is equivalent to their HPLMN;
c) UEs that are configured for MCS and are in their HPLMN or in a PLMN that is equivalent to it.
(NOTE 3):

-continued

| Access Identity number | UE configuration |
|---|---|

Access Identities 11 and 15 are valid in Home PLMN only if the EHPLMN list is not present or in any EHPLMN. Access Identities 12, 13, and 14 are valid in Home PLMN and visited PLMNs of home country only For this purpose the home country is defined as the country of the MCC part of the IMSI.

The access category may be classified into two types. The one type is a standardized access category. The category is defined in an RAN level, i.e., is specified in the standard document. Therefore, the same standardized access category may be applied to different business operators. In the present disclosure, a category corresponding to an emergency may belong to the standardized access category. All accesses may correspond to at least one of the standardized access category. The other type is an operator-specific (non-standardized) access category. The category is defined outside the 3GPP, and is not specified in the standard document. Therefore, what is meant for one operator-specific access category is different for each business operator. This is the same as in a category of an existing ACDC. A certain access triggered by the UE NAS may not be mapped to an operator-specific access category. The big difference to the existing ACDC is that the category may correspond to not only an application but also correspond to other factors that are a service type, a call type, a terminal type, a user group, a signaling type, a slice type, or a combination of the factors, as well as the application. That is, whether to an access is allowed may be controlled for accesses that belong to the other factors. The access category may be used to indicate a specific access as in Table below. Access categories Nos. 0 to 7 are used to indicate standardized access categories, and access categories Nos. 32 to 63 are used to indicate operator-specific access categories.

| Access Category number | Conditions related to UE | Type of access attempt |
|---|---|---|
| 0 | All | MO signaling resulting from paging |
| 1 (NOTE 1) | UE is configured for delay tolerant service and subject to access control for Access Category 1, which is judged based on relation of UE's HPLMN and the selected PLMN. | All except for Emergency |
| 2 | All | Emergency |
| 3 | All except for the conditions in Access Category 1. | MO signaling resulting from other than paging |
| 4 | All except for the conditions in Access Category 1. | MMTEL voice |
| 5 | All except for the conditions in Access Category 1. | MMTEL video |
| 6 | All except for the conditions in Access Category 1. | SMS |
| 7 | All except for the conditions in Access Category 1. | MO data that do not belong to any other Access Categories |
| 8-31 | | Reserved standardized Access Categories |
| 32-63 (NOTE 2) | All | Based on operator classification |

(NOTE 1):
The barring parameter for Access Category 1 is accompanied with information that define whether Access Category applies to UEs within one of the following categories:
a) UEs that are configured for delay tolerant service;
b) UEs that are configured for delay tolerant service and are neither in their HPLMN nor in a PLMN that is equivalent to it;
c) UEs that are configured for delay tolerant service and are neither in the PLMN listed as most preferred PLMN of the country where the UE is roaming in the operator-defined PLMN selector list on the SIM/USIM, nor in their HPLMN nor in a PLMN that is equivalent to their HPLMN.
(NOTE 2):
When there are an Access Category based on operator classification and a standardized Access Category to both of which an access attempt can be categorized, and the standardized Access Category is neither 0 nor 2, the UE applies the Access Category based on operator classification. When there are an Access Category based on operator classification and a standardized Access Category to both of which an access attempt can be categorized, and the standardized Access Category is 0 or 2, the UE applies the standardized Access Category.

A business operator server may provide the UE NAS 1*d*-10 with information about an operator-specific access category (management object (MO)). The information may indicate to which factor such as an application each operator-specific category corresponds. For example, access category No. 32 may indicate in the information that this corresponds to an access corresponding to Facebook application. The V-SNPN gNB 1*d*-20 may provide UEs with a category list providing barring configuration information and barring configuration information corresponding to each category.

The UE NAS 1*d*-10 maps a triggered access to one or more of the access identities and the access category. The mapping operation may be performed in all RRC states that are a connected mode (RRC_CONNECTED), an idle mode (RRC_IDLE), and an inactive mode (RRC_INACTIVE).

When the UE AS 1*d*-15 is provided information of the access identity or the access category with a message received from the UE NAS in all RRC states, the UE AS 1*d*-15 may perform, before performing a radio access triggered by the message, a barring check operation to determine whether this is allowed. Via the barring check operation, when the radio access is allowed, the UE may request RRC connection configuration from a network.

The UE AS **1*d*-15** may determine whether the access triggered by the UE NAS is allowed (barring check), by using the barring configuration information.

A business operator may want to allow only particular services from among accesses corresponding to at least one of Access Classes 11 to 15. Therefore, whether to allow an access that belongs to Access Classes 11, 12, 13, 14, and 15 and is indicated by an access identity may be determined according to an attribute identified by an access category. To this end, the present disclosure proposes a method of configuring barring configuration information of an access identity or an access category. In the present disclosure, it is assumed that the barring configuration information of the access category is configured of ac-barringFactor and ac-barringTime as barring configuration information of the existing ACB or ACDC. An example of ASN.1 structure of the barring configuration information is as below, and detailed descriptions thereof will be provided at a later time.

```
UAC-BarringPerPLMN-List ::=       SEQUENCE (SIZE (1.. maxPLMN)) OF UAC-BarringPerPLMN
UAC-BarringPerPLMN ::=            SEQUENCE {
    plmn-IdentityIndex                INTEGER (1..maxPLMN),
    uac-ACBarringListType           CHOICE{
        uac-ImplicitACBarringList          SEQUENCE (SIZE(maxAccessCat-1)) OF UAC-Barring
InfoSetIndex,
        uac-ExplicitACBarringList            UAC-BarringPerCatList
        }
}
UAC-BarringPerCatList ::= SEQUENCE (SIZE (1..maxAccessCat-1)) OF UAC-BarringPerCat
UAC-BarringPerCat ::= SEQUENCE {
    accessCategory                    INTEGER (1..maxAccessCat-1),
    uac-barringInfoSetIndex                UAC-BarringInfoSetIndex
}
UAC-BarringInfoSetIndex ::=           INTEGER (1..maxBarringInfoSet)
UAC-BarringInfoSetList ::= SEQUENCE (SIZE(1..maxBarringInfoSet)) OF UAC-BarringInfoSet
UAC-BarringtInfoSet ::= SEQUENCE {
  uac-BarringFactor               ENUMERATED {
                                    p00, p05, p10, p15, p20, p25, p30, p40,
                                    p50, p60, p70, p75, p80, p85, p90, p95},
  uac-BarringTime                 ENUMERATED {s4, s8, s16, s32, s64, s128, s256, s512},
  uac-BarringForAccessIdentity          BIT STRING (SIZE(7))
}
```

The UE AS **1*d*-15 may determine whether the service request is allowed, by using information of the access identity and the access category mapped by the NAS and corresponding barring configuration information received from the network. In the present disclosure, an operation of determining whether the service request is allowed is referred to as barring check. The UE may receive system information including the access control configuration information, and may store the configuration information. The barring configuration information may be provided for each PLMN/SNPN and each access category. BarringPerCatList IE may be used to provide barring configuration information of access categories that belong to one PLMN/SNPN. To this end, PLMN id (or SNPN id) and barring configuration information of each of the access categories may be included as a list in the IE. The barring configuration information of each access category may include access category id (or index) indicating a particular access category, uac-BarringForAccessidentity field, uac-BarringFactor field and uac-Barringtime field. The aforementioned barring check operation is as below. First, each of bits configuring uac-BarringForAccessidentityList may correspond to one access identity, and when a value of the bit is indicated as '0', an access associated with the access identity may be allowed. When at least one of corresponding bits in uac-BarringForAccessidentity is '0' with respect to at least one of the mapped access identities, an access may be allowed. When at least one of corresponding bits in uac-BarringForAccessidentity is not '0' with respect to at least one of the mapped access identities, additional barring check may be performed by additionally using uac-BarringFactor field. A range of the uac-BarringFactor $\alpha$ may be $0 \le \alpha < 1$. The AS 1*d*-15 derives one random value rand where $0 \le rand < 1$, and when the random value is smaller than the uac-BarringFactor, it may be considered that an access is not barred, or is barred otherwise. When it is determined that the access is barred, the UE AS 1*d*-15 delays an access attempt for a preset time derived by using Equation 1 below. The UE AS 1*d*-15** runs a timer having a value of the time. In the disclosure, the timer may be described as a barring timer.

"Tbarring"=(0.7+0.6*rand)*uac-BarringTime. [Equation 1]

When the access is barred, the UE AS **1*d*-15 may notify this to the UE NAS 1*d*-10. When the derived preset time elapses, the UE AS 1*d*-15 may notify the UE NAS 1*d*-10 of barring alleviation (an access request is possible). At this time, the UE NAS 1*d*-10 may request again an access from the UE AS 1*d*-15**.

The V-SNPN gNB **1*d*-20 may apply different barring configurations to an access in which a service has to be directly provided by the gNB, an access to be connected to an external home SP, and a credential access. For example, when a network is congested, the V-SNPN gNB 1*d*-20** may apply higher priority to the access in which a service has to be directly provided by the gNB. The present disclosure proposes options below for access control with respect to the credential access.

First option: When the UE NAS **1*d*-10 has selected an SNPN and a home SP or GID for an access to the V-SNPN gNB 1*d*-20, the UE NAS 1*d*-10 may map an access identity with respect to the access to a new access identity corresponding to the credential access. A preset existing access category may be mapped to the access. The mapping information and information about the selected SNPN and the Home SP or GID may be transmitted to the UE AS 1*d*-15. The V-SNPN gNB 1*d*-20 may indicate whether a barring check operation can be skipped with respect to the new access identity for each access category, as barring configuration information corresponding to the selected SNPN. If it is indicated that the barring check operation is skipped, the UE may skip the barring check operation and may attempt to access the V-SNPN gNB 1*d*-20**. The new access identity corresponding to the credential access may be provided for each SNPN.

Second option: When the UE NAS **1*d*-10 has selected an SNPN and a home SP or GID for an access to the V-SNPN gNB 1*d*-20, the UE NAS 1*d*-10** may map an access category with respect to the access to a new access category corresponding to the credential access. A preset existing access identity may be mapped to the access. The mapping information and information about the selected SNPN and the Home SP or GID may be transmitted to the UE AS. The gNB may broadcast barring configuration information corresponding to the new access category, as barring configuration information corresponding to the selected SNPN. The new access category corresponding to the credential access may be provided for each SNPN. The UE may perform a barring check operation by using the barring configuration information corresponding to the new access category.

Third option: The gNB may provide an indicator indicating whether a credential access is barred for each SNPN that supports the credential access. The indicator may be broadcast to UEs by using system information of the V-SNPN gNB **1*d*-20**. If the indicator is provided and an access triggered by the UE NAS is the credential access, it is considered that the access is barred from a corresponding cell. The indicator may be provided for each SNPN and each Home SP or GID. Also, the indicator may be provided for each access category.

Fourth option: The V-SNPN gNB **1*d*-20** may provide an indicator indicating whether barring configuration information for each access category provided for each SNPN is applied only to a credential access. If the indicator is provided and an access triggered by the UE NAS is the credential access, a barring check operation may be performed by using the barring configuration information of the access category mapped to the access. When the indicator is provided, the UE may not perform the barring check operation with respect to a normal access by using the provided barring configuration information. Via the barring check operation, when the access is allowed, the UE may attempt a random access operation for the credential access to a corresponding cell. The indicator may be provided for each SNPN and each home SP or GID. Also, the indicator may be provided for each access category.

Fifth option: The gNB may provide an indicator indicating whether barring configuration information for each access category provided for each SNPN is also applied to a credential access. If the indicator is not provided and an access triggered by the UE NAS **1*d*-10 is the credential access, the UE may attempt a random access operation for an access to a corresponding cell without a barring check operation with respect to the credential access. If the indicator is provided and an access triggered by the UE NAS 1*d*-10** is the credential access, the UE may perform a barring check operation by using the barring configuration information of the access category mapped to the access. Via the barring check operation, when the access is allowed, the UE may attempt a random access operation for the access to a corresponding cell. The indicator may be provided for each SNPN and each home SP or GID. Also, the indicator may be provided for each access category.

Sixth option: Separate barring configuration information to be applied only to a credential access may be provided for each access category. The barring configuration information may be provided for each home SP or GID.

The operations may be applied in an overlapping manner. When an access is allowed via the access control operation, the UE **1*d*-05 may perform an RRC connection operation to be connected to the cell. The UE may transmit an RRCSetupRequest message to the V-SNPN gNB 1*d*-20, and the V-SNPN gNB 1*d*-20 may transmit, to the UE, an RRCSetup message corresponding to the RRCSetupRequest message. The UE having received the RRCSetup message may transmit an RRCSetupComplete message to the V-SNPN gNB 1*d*-20. The V-SNPN gNB 1*d*-20 may be connected to a plurality of AMFs, and each AMF may be connected to a home SP. Therefore, the V-SNPN gNB 1*d*-20 may need to select an appropriate AMF that supports a home SP requested by the UE. To this end, the UE may need to report, to the V-SNPN gNB 1*d*-20, information about a home SP or GID selected by the UE NAS in the Setup procedure (1*d*-55). According to an embodiment of the present disclosure, the information may be reported to the V-SNPN gNB 1*d*-20 by using an RRCSetupRequest or RRCSetupComplete message. Also, the RRCSetupRequest message may include a new establishment cause value or a new indicator which indicates that the access is a credential access. The V-SNPN gNB 1*d*-20 may previously have information about an AMF capable of supporting a home SP or GID, and may select the AMF capable of supporting the home SP or GID by using home SP or GID information reported from the UE. If there is no supportable AMF, the V-SNPN gNB 1*d*-20 may prevent the UE from being connected to a corresponding cell, by using an RRCReject or RRCRelease message. When RRCSetupRequest includes the information about a home SP or GID selected by the UE NAS, the V-SNPN gNB 1*d*-20 may reject the UE by using an RRCReject message. On the other hand, when RRCSetupComplete includes the information about a home SP or GID selected by the UE NAS, the V-SNPN gNB 1*d*-20 may release connection to the UE by using an RRCRelease message. The RRCReject or RRCRelease message may include a cause value indicating that connection rejection or connection release occurs due to a not-supported home SP or GID (1*d*-60). Even when an appropriate AMF is selected, the AMF or a home SP may reject the service request. In this case, the V-SNPN gNB 1*d*-20** may release connection to the UE by using an RRCRelease message. The RRCRelease message may include a cause value indicating connection release due to rejection in the AMF or the home SP.

Figure 1E:
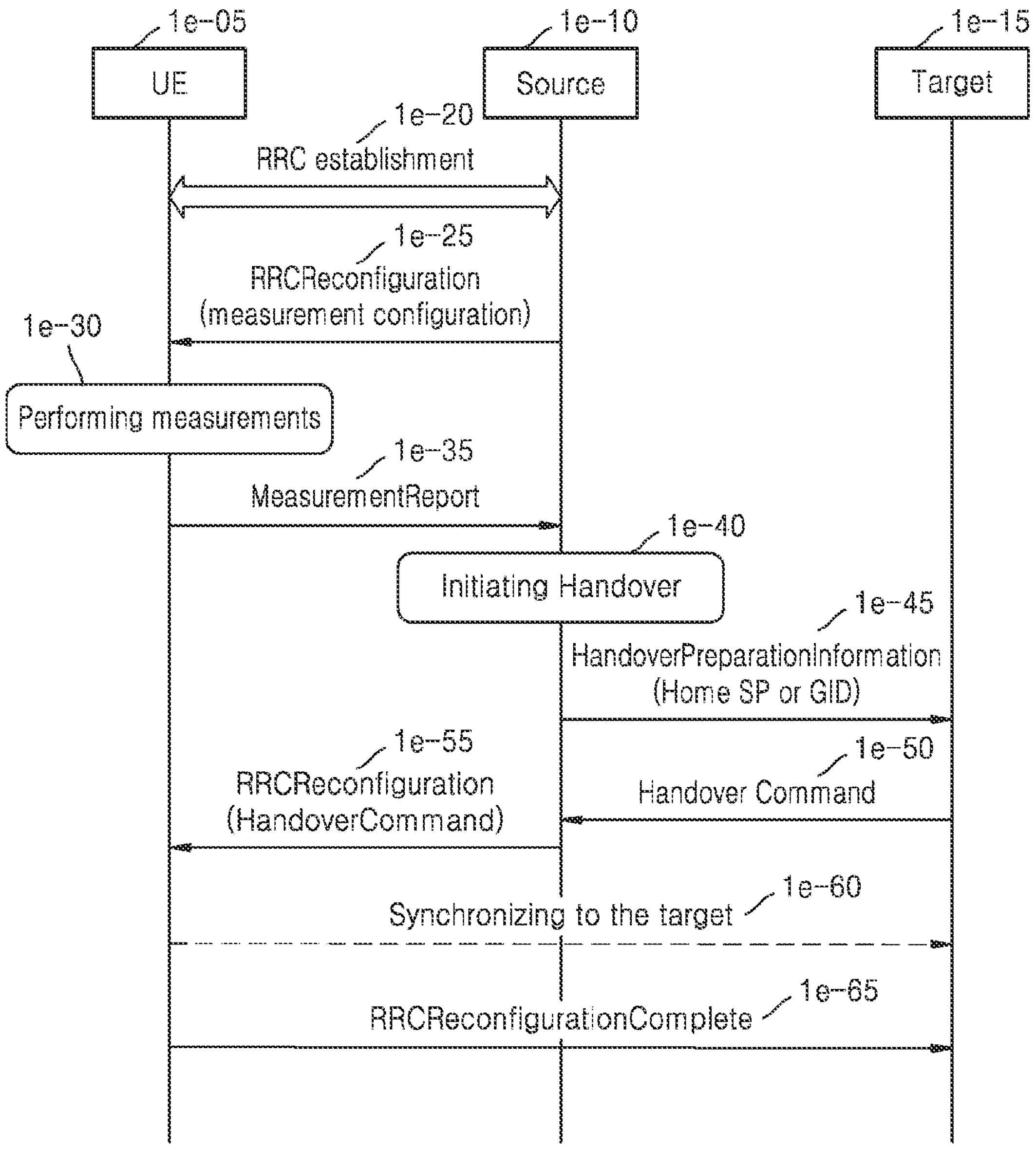
FIG. 1E is a flowchart of a procedure for supporting handover in a V-SNPN support cell according to an embodiment of the present disclosure.

FIG. 1E is a flowchart of a procedure for supporting handover in a V-SNPN support cell according to an embodiment of the present disclosure.

A UE **1*e*-05 may be connected to a source cell 1*e*-10 via the RRCSetup operation (1*e*-20). The UE 1*e*-05 may receive a preset RRC message including measurement configuration information from the source cell 1*e*-10 (1*e*-25). The UE 1*e*-05 may measure signal strengths of a serving cell and neighboring cells by applying the measurement configuration information (1*e*-30), and may report information of the collected cell measurement to the source cell 1*e*-10 periodically or upon occurrence of a preset event (1*e*-35). The source cell 1*e*-10 may determine whether to trigger a normal handover operation, based on the reported cell measurement information (1*e*-40**). For example, in a case where Event A3 (Neighbor becomes offset better than SpCell) is satisfied and thus cell measurement information is reported, the source cell 1*e*-10 may determine normal handover. If it is determined to trigger the normal handover, the source cell 1*e*-10 may request a target cell 1*e*-15 for the normal handover via a preset inter-node message (1*e*-45). According to an embodiment of the present disclosure, the handover request information may include information about a home SP or GID selected by the UE 1*e*-05. Alternatively, the source cell 1*e*-10 may provide the target cell 1*e*-15 with the UE-supporting home SP or GID information. Here, the source cell 1*e*-10 has to previously have the UE-supporting home SP or GID information, and the information may be directly provided from the UE 1*e*-05 or may be provide via an AMF. If the source cell 1*e*-10 attempts to obtain the UE-supporting home SP or GID information from the UE, the source cell 1*e*-10 may request the UE for the information by using a UEInformationRequest message, and the UE having received the request may report the information by using a UEInformationResponse message. Alternatively, at a preset time, the UE may report, to the source cell 1*e*-10, the information about a home SP or GID supported by the UE, by using a UEAssistanceInformation message.

The target cell 1*e*-15 having received the handover request may accept the handover request by using a preset admission control, in consideration of the information about the home SP or GID supported by the UE 1*e*-05, and may transmit, to the source cell, handover configuration information necessary for the normal handover operation (1*e*-50). For example, when the target cell 1*e*-15 does not support any one of a home SP selected by the UE 1*e*-05 or a home SP supported by the UE 1*e*-05, the target cell 1*e*-15 may not accept the handover request. The source cell 1*e*-10 may include, in a preset RRC message, additional configuration information and the handover configuration information, which is received from the target cell 1*e*-15, and may transmit the RRC message to the UE 1*e*-05 (1*e*-55). The configuration information may include an ID of a target cell, frequency information, configuration information (dedicated preamble information, dedicated radio resource information, etc.) necessary for a random access operation with respect to the target cell, transmission power information, cell radio network temporary identifier (C-RNTI) information used in the target cell, or the like.

The UE 1*e*-05 having received the handover configuration information may immediately perform a random access procedure on the target cell 1*e*-15 and may run T304 timer (1*e*-60). Also, the UE 1*e*-05 may stop an operation of data transmission and reception with the source cell 1*e*-10. The UE 1*e*-05 may transmit the received preamble. If the dedicated preamble is not provided, the UE 1*e*-05 may transmit one of preambles used based on contention. The target cell 1*e*-15 having received the preamble may transmit a random access response (RAR) message to the UE 1*e*-05. The UE 1*e*-05 may transmit msg3 to the target cell 1*e*-15 by using UL grant information included in the RAR. The msg3 may include an RRCReconfigurationComplete message (1*e*-65). When the random access procedure is successfully completed, the UE 1*e*-05 considers that the normal handover is successfully completed, and stops the running T304 timer. Also, the UE 1*e*-05 may perform an operation of data transmission and reception with the target cell 1*e*-15. If the normal handover is not successfully completed until T304 timer expires, the UE 1*e*-05 may consider the handover as failure. Here, the UE 1*e*-05 may declare radio link failure (RLF), and may perform a re-establishment operation. When declaring the RLF, the UE may record useful information that is collectable at that time, and may report an RLF report when the UE is connected to a cell at a later time.

Figure 1F:
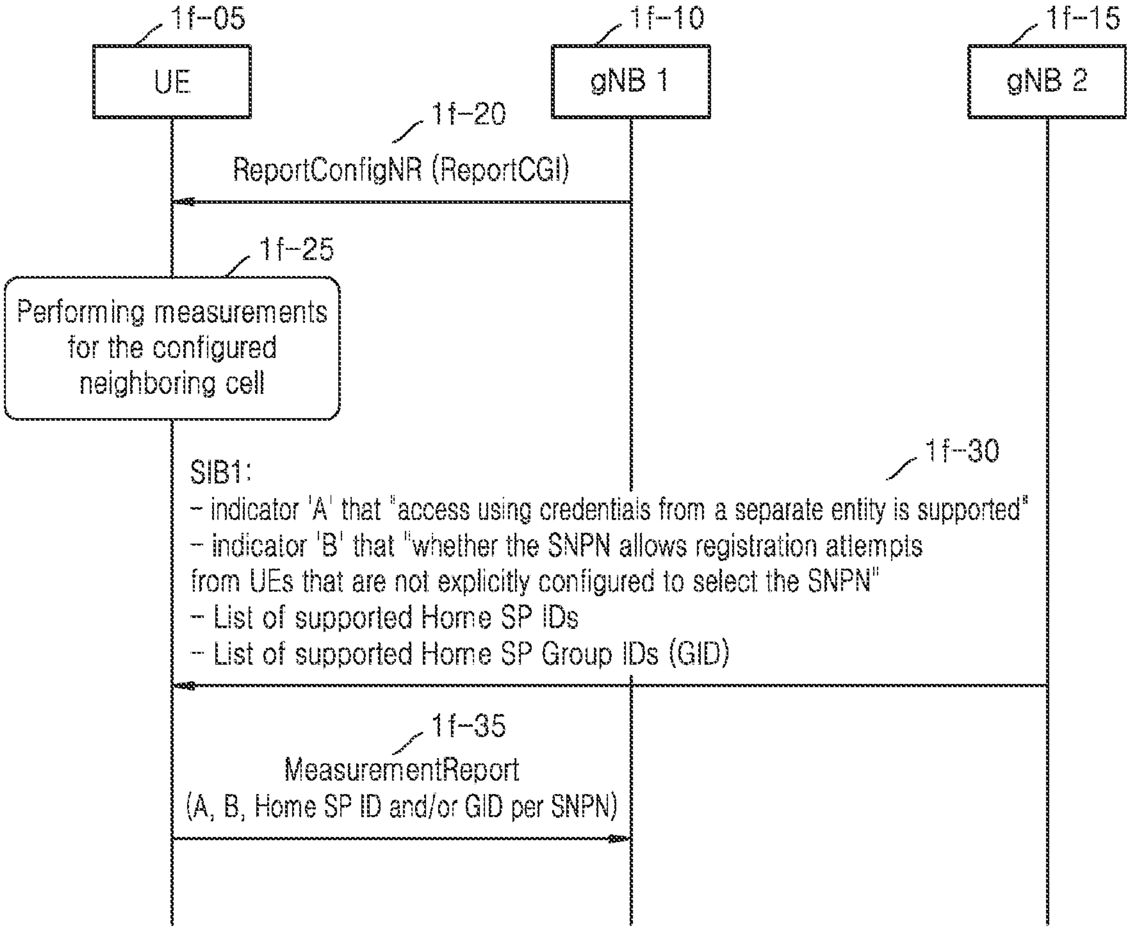
FIG. 1F is a flowchart of a procedure for collecting and reporting V-SNPN associated information according to an embodiment of the present disclosure.

FIG. 1F is a flowchart of a procedure for collecting and reporting V-SNPN associated information according to an embodiment of the present disclosure.

An automatic neighbor relation (ANR) function may be performed for automatic network optimization that is Self Organizing/Optimizing Network (SON). For network optimization, a gNB needs to collect information about neighboring cells. To this end, the gNB may indicate a UE to collect and report system information broadcast from a neighboring cell.

A gNB 1 1*f*-10 may configure a UE 1*f*-05 for cell measurement by using an RRCReconfiguration message (1*f*-20). The cell measurement configuration information may include information necessary to collect system information broadcast from a neighboring cell 1*f*-15. For example, Physical cell ID (PhysCellId) of a target cell from which information has to be collected, whether autonomous gap is used to receive system information broadcast from the target cell, whether system information associated with a credential access is to be collected, or the like may be included in the configuration information.

The UE having received the configuration information may receive preset system information broadcast from the configured cell (1*f*-25), and may collect preset information from the received system information (1*f*-30). The preset system information is SIB1, and system information associated with a credential access may be additionally collected. Information the UE has to collect from the received system information and report to the gNB is as below.

- ID list information of PLMNs (plmn-IdentityInfoList) supported by the configured cell 1*f*-15
- List information of frequency bands (frequencyBandList) supported by the configured cell
- ID list of PNI-NPNs and SNPNs (npn-IdentityInfoList) supported by the configured cell
- Information about the indicators A, B broadcast from the configured cell
- ID list of home SP and GID the configured cell supports for a credential access
- Human-readable name information about the home SP and GID the configured cell supports for a credential access The UE having collected the information may report the collected information to the gNB 1 1*f*-10 by using a MeasurementReport message (1*f*-35). The gNB 1 1*f*-10 having received the report of the collected information from the UE may broadcast information about a neighboring cell supporting the credential access, by using preset system information.

Figure 1G:
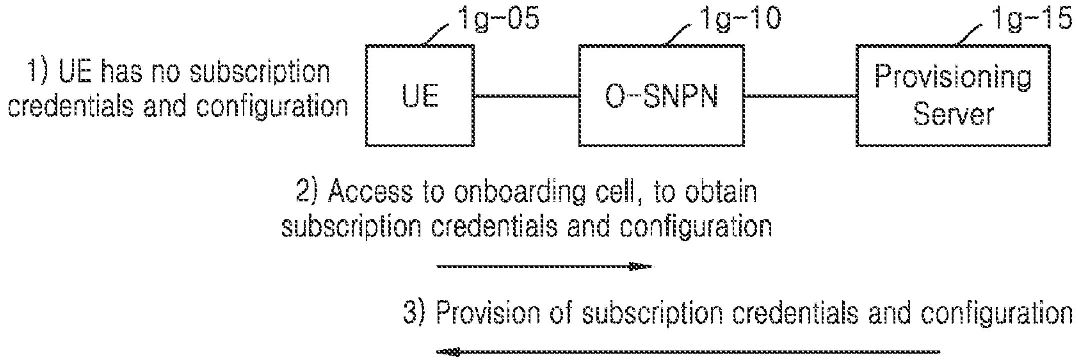
FIG. 1G is a conceptual diagram for describing an onboarding SNPN (O-SNPN) according to an embodiment of the present disclosure.

FIG. 1G is a conceptual diagram for describing an O-SNPN according to an embodiment of the present disclosure.

As described above, a UE 1*g*-05 having triggered a credential access may previously have credential access configuration information, and a V-SNPN may broadcast system information including ID information of a home SP supported by the V-SNPN. The UE 1*g*-05 may determine whether to access a cell, by considering V-SNPN ID that is broadcast via SIB1 of the V-SNPN gNB.

However, according to a case, the UE 1*g*-05 may not have the credential access configuration information. An SNPN that supports the UE 1*g*-05 to connect to a gNB and obtain the information from a specific server 1*g*-15 is referred to as an onboarding SNPN (O-SNPN) (1*g*-10). In the present disclosure, an access attempting to the O-SNPN so as to obtain the credential access configuration information is described as an onboarding access.

Figure 1H:
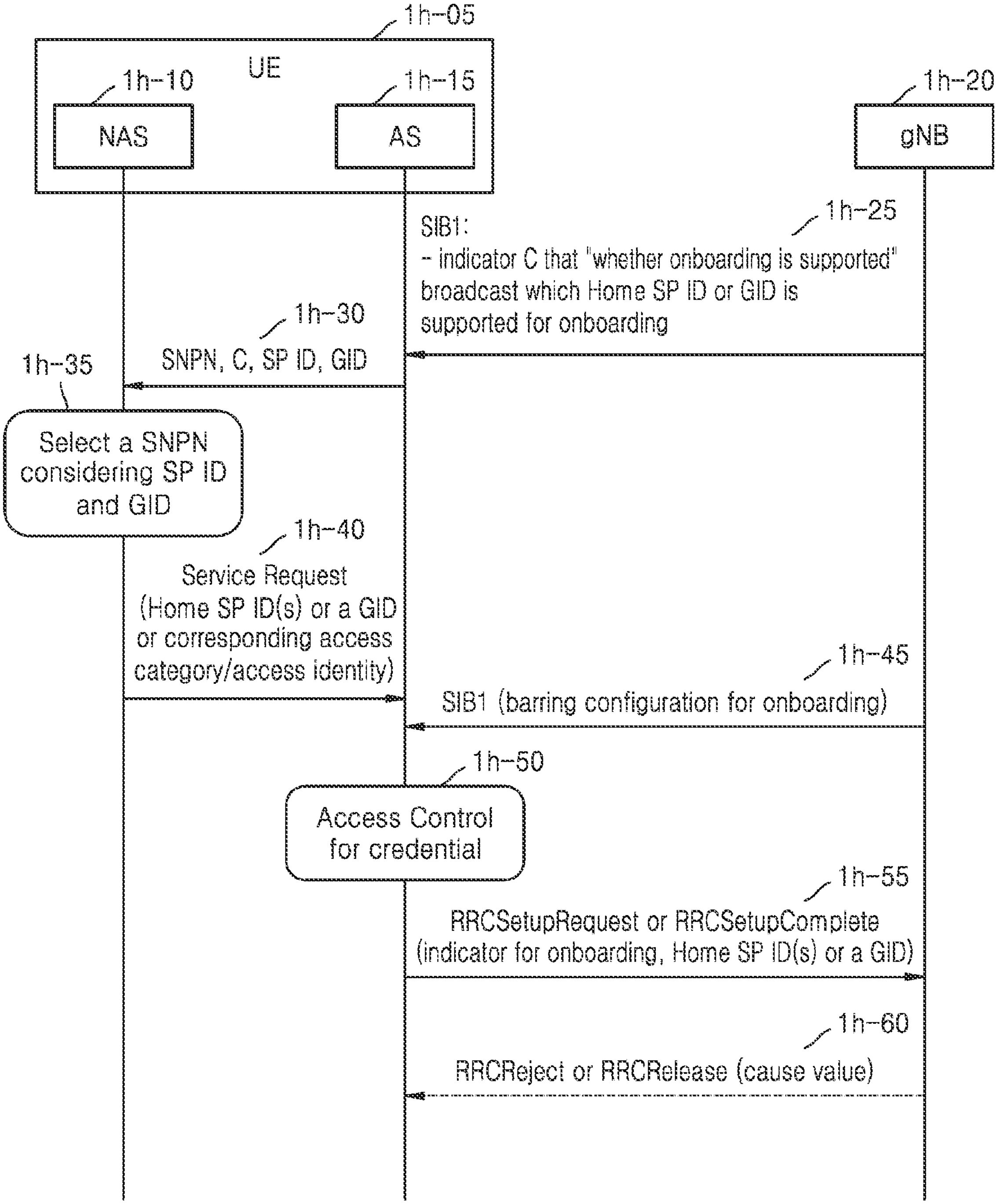
FIG. 1H is a flowchart of a procedure for accessing to an O-SNPN support cell according to an embodiment of the present disclosure.

FIG. 1H is a flowchart of a procedure for accessing to an O-SNPN support cell according to an embodiment of the present disclosure.

In FIG. 1H, the O-SNPN support cell is described as an O-SNPN gNB 1*h*-20, for convenience of descriptions. The O-SNPN gNB 1*h*-20 may broadcast information below, by using system information (1*h*-25).

Indicator C, which indicates whether a corresponding cell supports onboarding. The information may be broadcast via preset SIB (e.g., SIB1).

ID list information of home SPs supported by the O-SNPN gNB 1*h*-20. The information may be broadcast via preset SIB (e.g., SIB1), and may be provided for each SNPN supported by a corresponding cell.

Group ID list information of home SPs supported by the O-SNPN gNB 1*h*-20. When the O-SNPN gNB 1*h*-20 supports many home SPs, an amount of information to be broadcast via system information may sharply increase. Therefore, in order to decrease the signaling overhead, preset home SPs may be configured as one group. When the O-SNPN gNB 1*h*-20 supports all or some of home SPs included in the group, the O-SNPN gNB 1*h*-20 may broadcast an ID of the group via preset SIB (e.g., SIB1). With the group ID list, an ID list of supported home SPs may also be broadcast. In the present disclosure, the group ID is described as a group ID (GID). The information may be provided for each SNPN supported by a corresponding cell.

Name information of a home SP or GID which is readable to a human. When the O-SNPN gNB 1*h*-20 supports a plurality of home SPs or GIDs and a UE can support some of the plurality of home SPs or the GIDs, a user may manually select one of them. Therefore, in order to support this, there is a need to identify SPs or the GIDs with names that are readable to a human. According to an embodiment of the present disclosure, human-readable home SP or GID information may be broadcast to the UE by using preset SIB (e.g., SIB10). The information may be provided for each SNPN supported by a corresponding cell.

A UE AS 1*h*-15 having received the information via the SIB may transmit the received information to a UE NAS 1*h*-10. That is, the home SP and GID information for the indicator C and each SNPN may be transmitted to the UE NAS 1*h*-10 (1*h*-30). The UE NAS 1*h*-10 having received the information may select an SNPN to be onboarding accessed and a home SP or GID to be accessed, and may determine an access identity and an access category which correspond to a service type (1*h*-35). When an ATTACH or a service request is triggered, the UE NAS 1*h*-10 may transmit the selected information to the UE AS 1*h*-15 (1*h*-40).

In order to ease network congestion, the O-SNPN gNB 1*h*-20 may broadcast system information including barring configuration information for each SNPN (1*h*-45). The UE AS 1*h*-15 having received the information may determine whether an attempt via a barring check operation is allowed so as to attempt the access (1*h*-50).

The O-SNPN gNB 1*h*-20 may apply different barring configurations to an access in which a service has to be directly provided by the gNB, and an onboarding access. For example, when a network is congested, the O-SNPN gNB 1*h*-20 may apply higher priority to the access in which a service has to be directly provided by the gNB. The present disclosure proposes options below for access control with respect to the credential access.

First option: When the UE NAS 1*h*-10 has selected an SNPN and a home SP or GID for an access to the O-SNPN gNB 1*h*-20, the UE NAS 1*h*-10 may map an access identity with respect to the access to a new access identity corresponding to the credential access. A preset existing access category may be mapped to the access. The mapping information and information about the selected SNPN and the Home SP or GID may be transmitted to the UE AS 1*h*-15. The O-SNPN gNB 1*h*-20 may indicate whether a barring check operation can be skipped with respect to the new access identity for each access category, as barring configuration information corresponding to the selected SNPN. If it is indicated that the barring check operation is skipped, the UE may skip the barring check operation and may attempt to access the O-SNPN gNB 1*h*-20. The new access identity corresponding to the onboarding access may be provided for each SNPN.

Second option: When the UE NAS 1*h*-10 has selected an SNPN and a home SP or GID for an access to the O-SNPN gNB 1*h*-20, the UE NAS 1*h*-10 may map an access category with respect to the access to a new access category corresponding to the credential access. A preset existing access identity may be mapped to the access. The mapping information and information about the selected SNPN and the Home SP or GID may be transmitted to the UE AS 1*h*-15. The O-SNPN gNB 1*h*-20 may broadcast barring configuration information corresponding to the new access category, as barring configuration information corresponding to the selected SNPN. The new access category corresponding to the onboarding access may be provided for each SNPN. The UE may perform a barring check operation by using the barring configuration information corresponding to the new access category.

Third option: The gNB may provide an indicator indicating whether an onboarding access is barred for each SNPN that supports the credential access. The indicator may be broadcast to UEs by using system information of the O-SNPN gNB. If the indicator is provided and an access triggered by the UE NAS 1*h*-10 is the onboarding access, it is considered that the access is barred from a corresponding cell. The indicator may be provided for each SNPN and each Home SP or GID. Also, the indicator may be provided for each access category.

Fourth option: The gNB may provide an indicator indicating whether barring configuration information for each access category provided for each SNPN is applied only to an onboarding access. If the indicator is provided and an access triggered by the UE NAS 1*h*-10 is the onboarding access, a barring check operation may be performed by using the barring configuration information of the access category mapped to the access. When the indicator is provided, the UE may not perform the barring check operation with respect to a normal access by using the provided barring configuration information. Via the barring check operation, when the access is allowed, the UE may attempt a random access operation for the onboarding access to a corresponding cell. The indicator may be provided for each SNPN and each home SP or GID. Also, the indicator may be provided for each access category.

Fifth option: The gNB may provide an indicator indicating whether barring configuration information for each access category provided for each SNPN is also applied to an onboarding access. If the indicator is not provided and an access triggered by the UE NAS is the onboarding access, the UE may attempt a random access operation for an access to a corresponding cell without a barring check operation with respect to the onboarding access. If the indicator is provided and an access triggered by the UE NAS is the onboarding access, the UE may perform a barring check operation by using the barring configuration information of the access category mapped to the access. Via the barring check operation, when the access is allowed, a random access operation for the access to a corresponding cell is attempted. The indicator may be provided for each SNPN and each home SP or GID. Also, the indicator may be provided for each access category.

Sixth option: Separate barring configuration information to be applied only to an onboarding access may be provided for each access category. The barring configuration information may be provided for each home SP or GID.

The operations may be applied in an overlapping manner. When an onboarding access is allowed via the access control operation, the UE 1*h*-05 may perform an RRC connection operation to be connected to the cell. The UE 1*h*-05 may transmit an RRCSetupRequest message to the O-SNPN gNB 1*h*-20, and the O-SNPN gNB 1*h*-20 may transmit, to the UE, an RRCSetup message corresponding to the RRCSetupRequest message. The UE 1*h*-05 having received the RRCSetup message may transmit an RRCSetupComplete message to the O-SNPN gNB 1*h*-20. The O-SNPN gNB 1*h*-20 may be connected to a plurality of AMFs, and each AMF is connected to a specific server providing credential access configuration information or a default home SP. Therefore, the O-SNPN gNB 1*h*-20 may need to select an appropriate AMF that supports an onboarding access requested by the UE 1*h*-05. To this end, the UE 1*h*-05 may need to report, to the O-SNPN gNB 1*h*-20, whether the access is the onboarding access, and information about a home SP or GID selected by the UE NAS 1*h*-10 in the Setup procedure (1*h*-55). According to an embodiment of the present disclosure, the information about a home SP or GID may be reported to the O-SNPN gNB 1*h*-20 by using an RRCSetupRequest or RRCSetupComplete message. Also, the RRCSetupRequest message may include a new establishment cause value or a new indicator which indicates that the access is an onboarding access. The O-SNPN gNB 1*h*-20 may previously have information about an AMF capable of supporting a home SP or GID, and may select the AMF capable of supporting the home SP or GID by using home SP or GID information reported from the UE 1*h*-05. If there is no supportable AMF, the O-SNPN gNB 1*h*-20 may prevent the UE 1*h*-05 from being connected to a corresponding cell, by using an RRCReject or RRCRelease message. When RRCSetupRequest includes the information about a home SP or GID selected by the UE NAS 1*h*-10, the O-SNPN gNB 1*h*-20 may reject the UE 1*h*-05 by using an RRCReject message. On the other hand, when RRCSetupComplete includes the information about a home SP or GID selected by the UE NAS 1*h*-10, the O-SNPN gNB 1*h*-20 may release connection to the UE 1*h*-05 by using an RRCRelease message. The RRCReject or RRCRelease message may include a cause value indicating that connection rejection or connection release occurs due to a not-supported home SP or GID (1*h*-60). Even when an appropriate AMF is selected, the AMF or the specific server may reject the service request. In this case, the O-SNPN gNB 1*h*-20 may release connection to the UE 1*h*-05 by using an RRCRelease message. The RRCRelease message may include a cause value indicating connection release due to rejection in the AMF or the specific server.

Figure 1I:
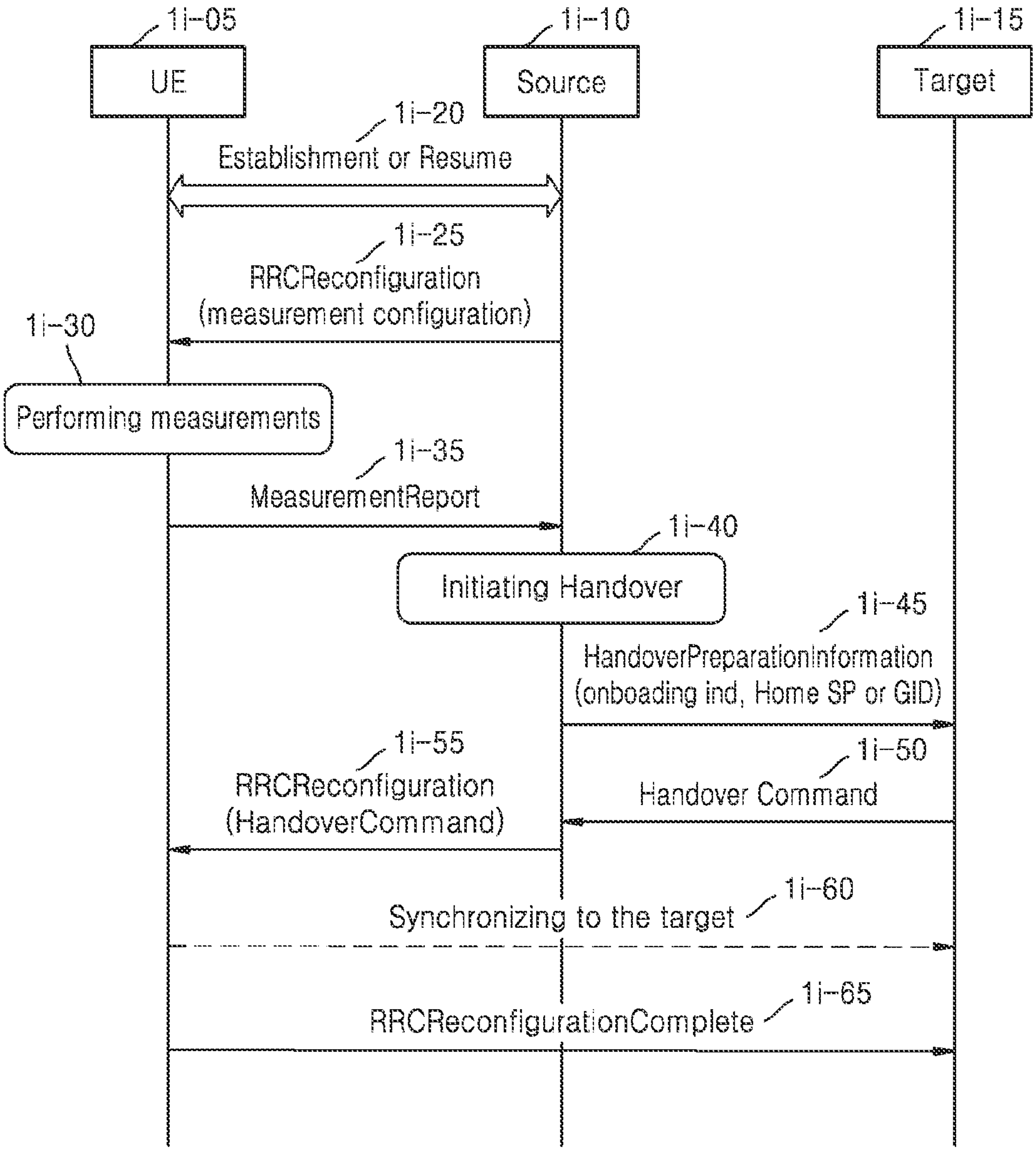
FIG. 1I is a flowchart of a procedure for supporting handover in an O-SNPN support cell according to an embodiment of the present disclosure.

FIG. 1I is a flowchart of a procedure for supporting handover in an O-SNPN support cell according to an embodiment of the present disclosure.

A UE 1*i*-05 may be connected to a source cell 1*i*-10 via the RRCSetup operation (1*i*-20). The UE 1*i*-05 may receive a preset RRC message including measurement configuration information from the source cell 1*i*-10 (1*i*-25). The UE 1*i*-05 may measure signal strengths of a serving cell and neighboring cells by applying the measurement configuration information (1*i*-30), and may report information of the collected cell measurement to the source cell 1*i*-10 periodically or upon occurrence of a preset event (1*i*-35). The source cell 1*i*-10 may determine whether to trigger a normal handover operation, based on the reported cell measurement information (1*i*-40). For example, in a case where Event A3 (Neighbor becomes offset better than SpCell) is satisfied and thus cell measurement information is reported, the source cell 1*i*-10 may determine normal handover. If it is determined to trigger the normal handover, the source cell 1*i*-10 may request a target cell 1*i*-15 for the normal handover for supporting the onboarding access via a preset inter-node message (1*i*-45). According to an embodiment of the present disclosure, the handover request information may include an onboarding indicator, and information about a home SP or GID selected by the UE. Alternatively, the source cell 1*i*-10 may provide the target cell 1*i*-15 with the information about a home SP or GID supported by the UE 1*i*-05. Here, the source cell 1*i*-10 has to previously have the information about a home SP or GID supported by the UE 1*i*-05, and the information may be directly provided from the UE or may be provide via an AMF. If the gNB attempts to obtain the UE-supporting home SP or GID information from the UE, the gNB may request the UE for the information by using a UEInformationRequest message, and the UE having received the request may report the information by using a UEInformationResponse message. Alternatively, at a preset time, the UE may report, to the gNB, the information about a home SP or GID supported by the UE, by using a UEAssistanceInformation message. The target cell 1*i*-15 having received the request may accept the request by using a preset admission control, in consideration of the information about the home SP or GID supported by the UE 1*i*-05, and may transmit, to the source cell 1*i*-10, handover configuration information necessary for the normal handover operation (1*i*-50). For example, when the target cell 1*i*-15 does not support any one of a home SP selected by the UE 1*i*-05 or a home SP supported by the UE 1*i*-05, the target cell 1*i*-15 may not accept the handover request. The source cell 1*i*-10 may include, in a preset RRC message, the handover configuration information received from the target cell 1*i*-15 and additional configuration information, and may transmit the RRC message to the UE 1*i*-05 (1*i*-55). The configuration information may include an ID of a target cell, frequency information, configuration information (dedicated preamble information, dedicated radio resource information, etc.) necessary for a random access operation with respect to the target cell, transmission power information, C-RNTI information used in the target cell, or the like.

The UE having received the handover configuration information may immediately perform a random access procedure on the target cell 1*i*-15 and may run T304 timer (1*i*-60). Also, an operation of data transmission and reception with the source cell 1*i*-10 is stopped. The UE 1*i*-05 may transmit the received preamble. If the dedicated preamble is not provided, the UE may transmit one of preambles used based on contention. The target cell 1*i*-15 having received the preamble may transmit a random access response (RAR)

message to the UE 1i-05. The UE 1i-05 may transmit msg3 to the target cell 1i-15 by using UL grant information included in the RAR. The msg3 may include an RRCReconfigurationComplete message (1i-65). When the random access procedure is successfully completed, the UE 1i-05 considers that the normal handover is successfully completed, and stops the running T304 timer. Also, the UE 1i-05 may perform an operation of data transmission and reception with the target cell 1i-15. If the normal handover is not successfully completed until T304 timer expires, the UE 1i-05 may consider the handover as failure. Here, the UE 1i-05 may declare RLF, and may perform a re-establishment operation. When declaring the RLF, the UE may record useful information that is collectable at that time, and may report an RLF report when the UE is connected to a cell at a later time.

Figure 1J:
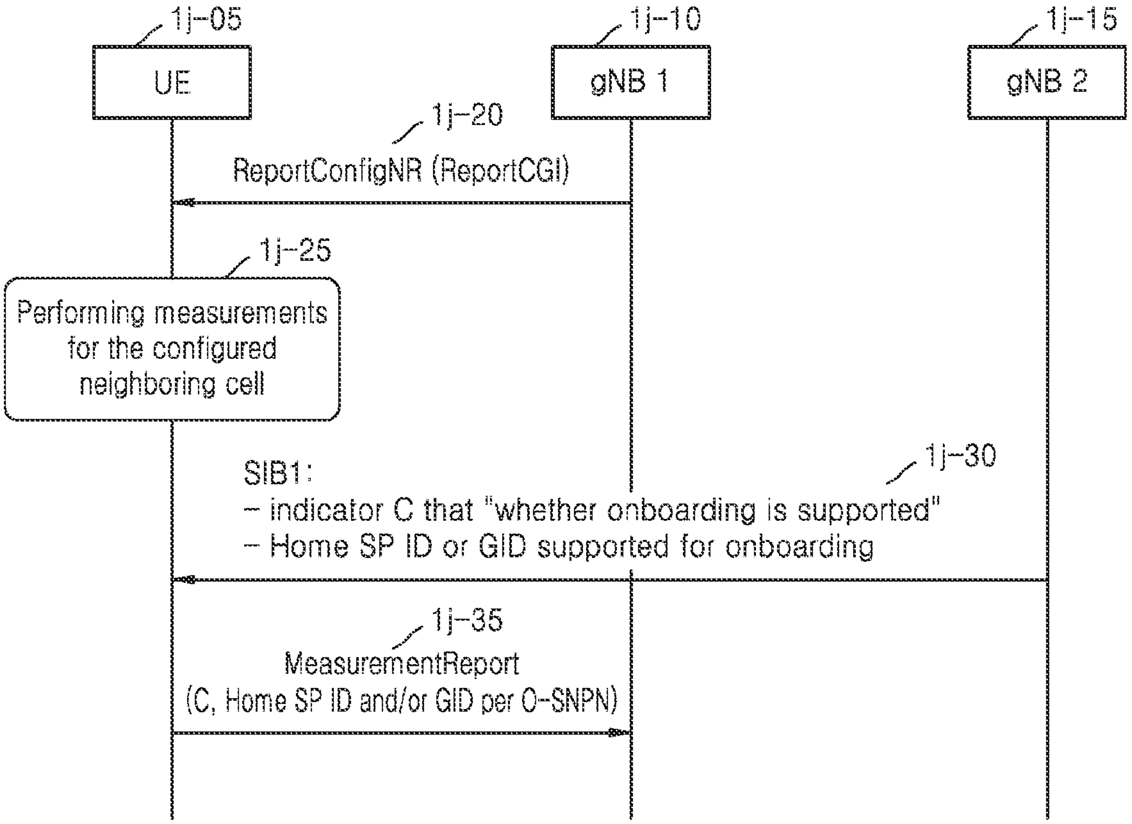
FIG. 1J is a flowchart of a procedure for collecting and reporting O-SNPN associated information according to an embodiment of the present disclosure.

FIG. 1J is a flowchart of a procedure for collecting and reporting O-SNPN associated information according to an embodiment of the present disclosure.

A gNB 1 1j-10 may configure a UE 1f-05 for cell measurement by using an RRCReconfiguration message (1j-20). The cell measurement it configuration information may include information necessary to collect system information broadcast from a neighboring cell 1j-15. For example, Physical cell ID (PhysCellId) of a target cell from which information has to be collected, whether autonomous gap is used to receive system information broadcast from the target cell, whether system information associated with a credential access is to be collected, or the like may be included in the configuration information.

The UE 1j-05 having received the configuration information may receive preset system information broadcast from the configured cell (1j-25), and may collect preset information (1j-30). The preset system information is SIB1, and system information associated with a credential access may be additionally collected. Information the UE 1i-05 has to collect from the received system information and report to the gNB is as below.

- ID list information of PLMNs (plmn-IdentityInfoList) supported by the configured cell 1j-15
- List information of frequency bands (frequencyBandList) supported by the configured cell
- ID list of PNI-NPNs and SNPNs (npn-IdentityInfoList) supported by the configured cell
- Information about the indicator C broadcast from the configured cell
- ID list of home SP and GID the configured cell supports for an onboarding access
- Human-readable name information about the home SP and GID the configured cell supports for an onboarding access The UE may collect the information by using an autonomous gap or a measured measurement gap. The UE may report the collected information to the gNB 1 1j-10, by using a MeasurementReport message (1j-35). The gNB 1 1j-10 having received the report of the collected information may broadcast information about a neighboring cell supporting the onboarding access, by using preset system information.

Figure 1K:
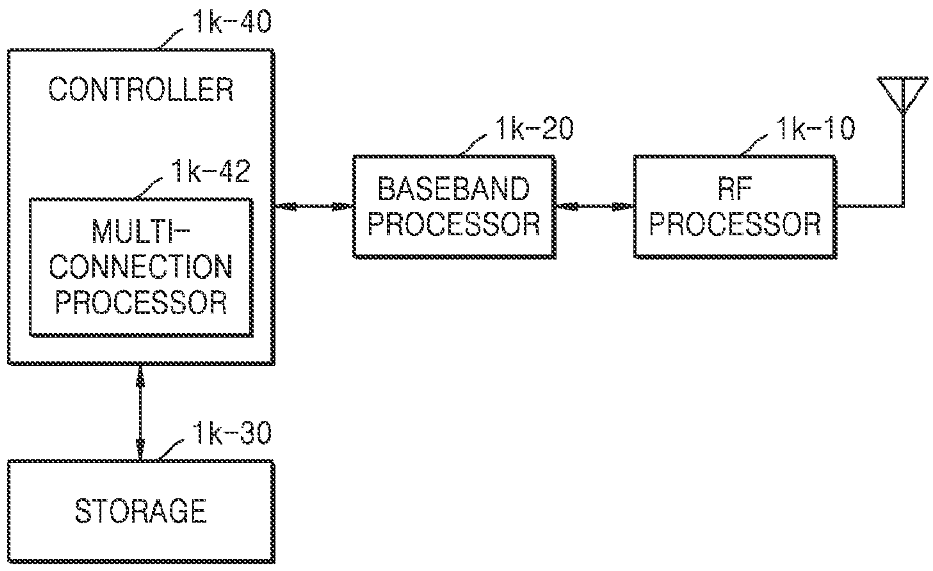
FIG. 1K is a block diagram illustrating an internal configuration of a user equipment (UE) to which the present disclosure is applied.

FIG. 1K is a block diagram illustrating an internal configuration of a UE to which the present disclosure is applied.

Referring to FIG. 1K, the UE may include a radio frequency (RF) processor 1k-10, a baseband processor 1k-20, a storage 1k-30, and a controller 1k-40.

The RF processor 1k-10 performs functions of transmitting and receiving signals via radio channels, such as band conversion and amplification of the signals. That is, the RF processor 1k-10 up-converts a baseband signal provided from the baseband processor 1k-20, into an RF band signal and then transmits the RF band signal via an antenna, and down-converts an RF band signal received via the antenna, into a baseband signal. For example, the RF processor 1k-10 may include a transmission filter, a reception filter, an amplifier, a mixer, an oscillator, a digital-to-analog convertor (DAC), an analog-to-digital convertor (ADC), or the like. Although only one antenna is illustrated in the drawing, the UE may include a plurality of antennas. Also, the RF processor 1k-10 may include a plurality of RF chains. In addition, the RF processor 1k-10 may perform beamforming. For beamforming, the RF processor 1k-10 may respectively adjust phases and intensities of signals to be transmitted or received via a plurality of antennas or antenna elements. Also, the RF processor may perform a MIMO operation and may receive a plurality of layers in the MIMO operation.

The baseband processor 1k-20 may convert between a baseband signal and a bitstream based on physical entity specifications of a system. For example, for data transmission, the baseband processor 1k-20 may generate complex symbols by encoding and modulating a transmission bitstream. For data reception, the baseband processor 1k-20 may reconstruct a received bitstream by demodulating and decoding a baseband signal provided from the RF processor 1k-10. For example, according to an OFDM scheme, for data transmission, the baseband processor 1k-20 generates complex symbols by encoding and modulating a transmit bitstream, maps the complex symbols to subcarriers, and then configures OFDM symbols by performing inverse fast Fourier transform (IFFT) and cyclic prefix (CP) insertion. For data reception, the baseband processor 1k-20 may segment a baseband signal provided from the RF processor 1k-10, into OFDM symbol units, may reconstruct signals mapped to subcarriers by performing a fast Fourier transform (FFT) computation, and then may reconstruct a received bitstream by demodulating and decoding the signals.

The baseband processor 1k-20 and the RF processor 1k-10 transmit and receive signals as described above. Accordingly, the baseband processor 1k-20 and the RF processor 1k-10 may be described as a transmitter, a receiver, a transceiver, or a communicator. In addition, at least one of the baseband processor 1k-20 and the RF processor 1k-10 may include a plurality of communication modules to support a plurality of different radio access technologies. Also, at least one of the baseband processor 1k-20 and the RF processor 1k-10 may include different communication modules to process signals of different frequency bands. For example, the different radio access technologies may include a wireless LAN (e.g. IEEE 802.11), a cellular network (e.g. LTE), or the like. Also, the different frequency bands may include a super-high frequency (SHF) (e.g., 2.NRHz, NRhz) band and a millimeter wave (mmWave) (e.g., 60 GHz) band.

The storage 1k-30 stores basic programs, application programs, and data, e.g., configuration information, for operations of the UE. In particular, the storage 1k-30 may store information associated with a second access node that performs wireless communication by using a second radio access technology. The storage 1k-30 provides the stored data according to the request by the controller 1k-40.

The controller 1k-40 may control overall operations of the UE. For example, the controller 1k-40 may transmit and receive signals via the baseband processor 1k-20 and the RF processor 1k-10. Also, the controller 1k-40 may record and read data on or from the storage 1k-40. To this end, the controller 1k-40 may include at least one processor. For example, the controller 1k-40 may include a communication processor (CP) for controlling communications and an application processor (AP) for controlling an upper layer such as an application program. The controller 1*k*-40 according to an embodiment may include a multi-connection processor 1*k*-42.

Figure 1L:
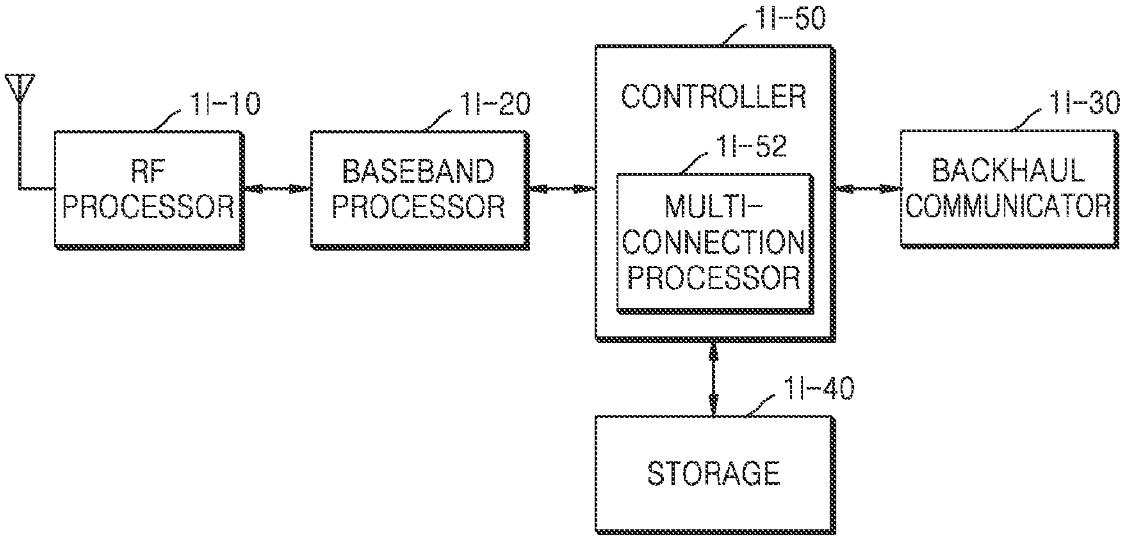
FIG. 1L is a block diagram illustrating a configuration of a base station (BS) according to the present disclosure.

FIG. 1L is a block diagram illustrating a configuration of a BS according to the present disclosure.

As illustrated in FIG. 1L, the BS includes a RF processor 1*l*-10, a baseband processor 1*l*-20, a backhaul communicator 1*l*-30, a storage 1*l*-40, and a controller 1*l*-50.

The RF processor 1*l*-10 may perform functions of transmitting and receiving signals via radio channels, e.g., band conversion and amplification of the signals. That is, the RF processor 1*l*-10 may up-convert a baseband signal provided from the baseband processor 1*l*-20, into an RF band signal and then may transmit the RF band signal via an antenna, and may down-convert an RF band signal received via an antenna, into a baseband signal. For example, the RF processor 1*l*-10 may include a transmission filter, a reception filter, an amplifier, a mixer, an oscillator, a DAC, an ADC, or the like. Although only one antenna is illustrated in FIG. 1L, the first access node may include a plurality of antennas. Also, the RF processor 1*l*-10 may include a plurality of RF chains. In addition, the RF processor 1*l*-10 may perform beamforming. For beamforming, the RF processor 1*l*-10 may respectively adjust phases and intensities of signals to be transmitted or received via a plurality of antennas or antenna elements. The RF processor may perform a downlink MIMO operation by transmitting one or more layers.

The baseband processor 1*l*-20 may convert between a baseband signal and a bitstream, based on physical entity specifications of a first radio access technology. For example, for data transmission, the baseband processor 1*l*-20 may generate complex symbols by encoding and modulating a transmission bitstream. Also, for data reception, the baseband processor 1*l*-20 may reconstruct a received bitstream by demodulating and decoding a baseband signal provided from the RF processor 1*l*-10. For example, according to an OFDM scheme, for data transmission, the baseband processor 1*l*-20 may generate complex symbols by encoding and modulating a transmission bitstream, may map the complex symbols to subcarriers, and then may configure OFDM symbols by performing IFFT and CP insertion. Also, for data reception, the baseband processor 1*l*-20 may segment a baseband signal provided from the RF processor 1*l*-10, into OFDM symbol units, may reconstruct signals mapped to subcarriers by performing FFT, and then may reconstruct a received bitstream by demodulating and decoding the signals. The baseband processor 1*l*-20 and the RF processor 1*l*-10 may transmit and receive signals as described above. Accordingly, the baseband processor 1*l*-20 and the RF processor 1*l*-10 may also be called a transmitter, a receiver, a transceiver, a communicator, or a wireless communicator.

The backhaul communicator 1*l*-30 provides an interface for communicating with other nodes in a network. That is, the backhaul communicator 1*l*-30 may convert a bitstream, which is transmitted from the primary BS to another node, for example, a secondary BS, a core network, etc. into a physical signal, and may converts a physical signal, which is received from another node, into a bitstream.

The storage 1*l*-40 may store basic programs, application programs, and data, e.g., configuration information, for operations of the BS. In particular, the storage 1*l*-40 may store information about bearers allocated for a connected UE and measurement results reported from the connected UE. Also, the storage 1*l*-40 may store criteria information used to determine whether to provide or release dual connectivity to or from the UE. The storage 1*l*-40 may provide the stored data according to the request by the controller 1*l*-50.

The controller 1*l*-50 may control overall operations of the BS. For example, the controller 1*l*-50 may transmit and receive signals via the baseband processor 1*l*-20 and the RF processor 1*l*-10, or the backhaul communicator 1*l*-30. Also, the controller 1*l*-50 may record and read data on or from the storage 1*l*-40. To this end, the controller 1*l*-50 may include at least one processor. The controller 1*l*-50 according to an embodiment may include a multi-connection processor 1*l*-52.

Use the term "Credentials Holder (CH)" for the external entity providing subscription or credential for SNPNs. CH may refer to an external entity that provides a subscription or a credential for SNPNs. That is, in the present disclosure, CH refers to an external server that provides the configuration information associated with a home SP or a credential access.

Use the term "Group IDs for Network Selection (GINs)" for the service provider Group IDs. That is, in the present disclosure, GIN refers to a group ID list of the home SP.

A BS may provide a GIN list supportable for a credential access and an onboarding access for each SNPN to UEs via system information.

Each GIN list corresponding to the credential access and the onboarding access may be common or may be provided as separate lists via the system information.

When at least one GIN from among GINs belonging to each GIN list corresponding to the credential access and the onboarding access is different, the BS may transmit each GIN list via the system information. In another example, when all GINs belonging to each GIN list corresponding to the credential access and the onboarding access are equal, the BS may transmit one common GIN list.

The GIN list is in the form of a bitmap and a bit at a corresponding position in a preset GIN set may be configured.

A cell that supports an SNPN may broadcast PWS information. A PWS is a function to notify UEs of a disaster by broadcasting a preset SIB (i.e., SIB6, 7, 8) including information related to the disaster.

An SNPN cell may be installed as a private wireless network in a smart factor or the like. When a local disaster situation such as fire occurs in the factory, the PWS may be used to notify UEs in the factory of the disaster situation.

Two types of the PWS may be applied to the SNPN cell. The one is a PWS all UEs have to receive regardless of an SNPN, and the other one is a PWS only UEs that belong to a particular SNPN have to receive. One cell may support a plurality of SNPNs. Here, there may be PWS information associated with only a specific SNPN. For example, a first SNPN is a private purpose of the factory, and a second SNPN is for the support of a credential access or an onboarding access. There may be PWS information such as fire which has to be shared with all UEs in the factory, and may be PWS information that is acceptable to be shared with only specific UEs. The PWS information that is acceptable to be shared with only specific UEs may be used to notify a particular problem (e.g., a stop in a production line, etc.) in the factory.

Therefore, the present disclosure proposes PWS information to be provided for each SNPN.

The BS may indicate a UE that a PWS SIB is broadcast, by using an etwsAndCmasIndication bit in a Short Message transmitted via a physical downlink control channel (PDCCH). The UE having received the indicator has to receive SIB1 so as to obtain scheduling information of the PWS SIB. Here, the BS may provide information indicating which SNPN is associated with the PWS SIB (SIB6, 7, 8), via a preset SIB (e.g., SIB1). The UE may perform an operation of receiving the PWS SIB when there is PWS information about an SNPN to which the UE belongs, via the information. For example, SIB1 may include SNPN list information which needs to receive a broadcast PWS SIB. As another example, SIB1 may include SNPN list information which does not need to receive a broadcast PWS SIB. The UE having received the SNPN list has to receive the broadcast PWS SIB if an SNPN to which the UE belongs is included in the list. As another example, the UE does not need to receive the broadcast PWS SIB if an SNPN to which the UE belongs is not included in the list. The SNPN list may be in the form of a bitmap, and an order of bits may match an SNPN order in a list of SNPNs supported by the cell which is provided via system information. When all UEs have to receive, the SNPN information may include an indicator indicating that all UEs have to receive a PWS SIB, or alternatively, SIB1 provides scheduling information about the PWS SIB but the SNPN information is not configured in system information. For example, a particular bit of the bitmap may be used to indicate that all UEs have to receive.

As another method, PWS information may be provided for each GID. Here, the BS may provide information indicating which GIN is associated with the PWS SIB (SIB6, 7, 8), via a preset SIB (e.g., SIB1). The UE may perform an operation of receiving the PWS SIB when the information includes PWS information about a GIN to which the UE belongs.

In addition, PWS information for each SNPN may be included in each PWS SIB. The UE has to decode PWS information corresponding to an SNPN to which the UE belongs. Here, for each PWS information, index information indicating a corresponding SNPN may be included. The PWS SIB may also include information all UEs have to receive.

The invention claimed is:

1. A method, performed by a user equipment (UE), in a wireless communication system, the method comprising:

receiving, through at least one system information block, information regarding one or more group identifications (IDs) for selection of a network and information indicating whether onboarding is enabled, wherein the one or more group IDs for the selection of the network include a group ID supported by a stand-alone non-public network (SNPN) for the onboarding;

forwarding, from an access stratum (AS) of the UE to a non-access stratum (NAS) of the UE, the information indicating whether the onboarding is enabled and the information regarding the one or more group IDs for the selection of the network; and based on the forwarding, selecting, by the NAS of the UE, the SNPN for the onboarding.

2. The method of claim 1, further comprising:

receiving a radio resource control (RRC) setup message from a base station of the selected SNPN; and transmitting, to the base station, an RRC setup complete message including information indicating that establishment is for the onboarding.

3. A user equipment (UE) in a wireless communication system, the UE comprising:

a transceiver; and at least one processor coupled to the transceiver and configured to:

receive, through at least one system information block, information regarding one or more group identifications (IDs) for selection of a network and information indicating whether onboarding is enabled, wherein the one or more group IDs for the selection of the network include a group ID supported by a stand-alone non-public network (SNPN) for the onboarding, forward, from an access stratum (AS) of the UE to a non-access stratum (NAS) of the UE, the information indicating whether the onboarding is enabled and the information regarding the one or more group IDs for the selection of the network, and based on the forwarding, select, by the NAS of the UE, the SNPN for the onboarding.

4. The UE of claim 3, wherein the at least one processor is further configured to:

receive a radio resource control (RRC) setup message from a base station of the selected SNPN, and transmit, to the base station, an RRC setup complete message including information indicating that establishment is for the onboarding.

* * * * *